United States Patent [19]

Hagiwara et al.

[11] Patent Number: 5,095,417
[45] Date of Patent: Mar. 10, 1992

[54] APPARATUS FOR CARRYING OUT SERIAL CONTROL

[75] Inventors: Masao Hagiwara; Makoto Takebe; Masakazu Moritoki, all of Kanagawa, Japan

[73] Assignee: Kabushiki Kaisha Komatsu Seisakusho, Tokyo, Japan

[21] Appl. No.: 459,811

[22] PCT Filed: May 16, 1989

[86] PCT No.: PCT/JP89/00494

§ 371 Date: Jan. 12, 1990

§ 102(e) Date: Jan. 12, 1990

[87] PCT Pub. No.: WO89/11763

PCT Pub. Date: Nov. 30, 1989

[30] Foreign Application Priority Data

May 17, 1988 [JP] Japan .................. 63-120337
Oct. 13, 1988 [JP] Japan .................. 63-258207

[51] Int. Cl.$^5$ .................. G06F 15/46; G06F 13/37
[52] U.S. Cl. .................. 364/138; 340/825.06; 364/221.9; 364/222; 364/241.1; 364/921; 364/940.5; 364/DIG. 1; 364/DIG. 2
[58] Field of Search .................. 364/138, 139, 140, 141, 364/131-134, 200 MS File, 900 MS File; 340/825.06, 825.07, 825.14, 825.11

[56] References Cited

U.S. PATENT DOCUMENTS

| | | | |
|---|---|---|---|
| 4,811,195 | 3/1989 | Evans | 364/138 X |
| 4,831,582 | 5/1989 | Miller et al. | 364/138 X |
| 4,888,714 | 12/1989 | Dingle | 364/138 X |
| 4,951,234 | 8/1990 | Bellows | 364/138 X |
| 4,979,094 | 12/1990 | Gemmell et al. | 364/146 X |

Primary Examiner—Joseph Ruggiero
Attorney, Agent, or Firm—Diller, Ramik & Wight

[57] ABSTRACT

This apparatus for carrying out serial control comprises a plurality of node controllers each including a group of sensors (21S to 2nS), a group of actuators (21A to 2nA) or the like terminal components and a main controller for controlling the node controllers and the terminal components in an annular configuration or in a daisy-chain-shaped configuration. The main controller sends a frame signal which includes a first identification code (STI) indicative of the head position of sensor data and a second identification code (STO) indicative of the head position of actuator controlling data in one frame. Each node controller including a group of sensors feeds its own sensor data to a location just behind the first identification code of the received frame signal and sends to the subsequent stage the frame signal delayed by a length of the sensor data having the received frame signal fed thereto, subsequent to the signal having the sensor data fed thereto. Further, each node controller including a group of actuators extracts its own actuator control data from a location just behind a second identification code of the received frame signal and then sends the frame signal having the actuator control data extracted therefrom, subsequent to the frame signal which has been delayed by a length equivalent to the actuator control data having the received frame signal extracted therefrom.

4 Claims, 16 Drawing Sheets

| INPUT | STI DETECTION | STI(mi) BIT DELAY | 1ST STO (mk−0.5) DELAY | 2ND STO DETECTION | 1ST SP TERR DELAY | 2ND SP DETECTION | ERROR CHECKING COMPETION | ERR' SENDING COMPLETION | |
|---|---|---|---|---|---|---|---|---|---|
| SW11 | O-1 | O-4 | O-2 | ← | ← | ← | O-3 | ← | O-1 |
| SW12 | OFF | ← | ON | ← | OFF | ← | ← | ← | ← |
| SW13 | OFF | ← | ← | ← | ON | ← | OFF | ← | ← |
| SW14 | OFF | ON | ← | ← | ← | OFF | ← | ← | ← |
| SW15 | OFF | ← | ← | ON|OFF | ← | ← | ← | ← | ← |
| SW16 | OFF | ← | ← | ← | ← | ← | ← | ON|OFF | ← |
| SW17 | OFF | ← | ON | ← | ← | ← | OFF | ← | ← |

← : SAME AS THE LEFT COLUMN

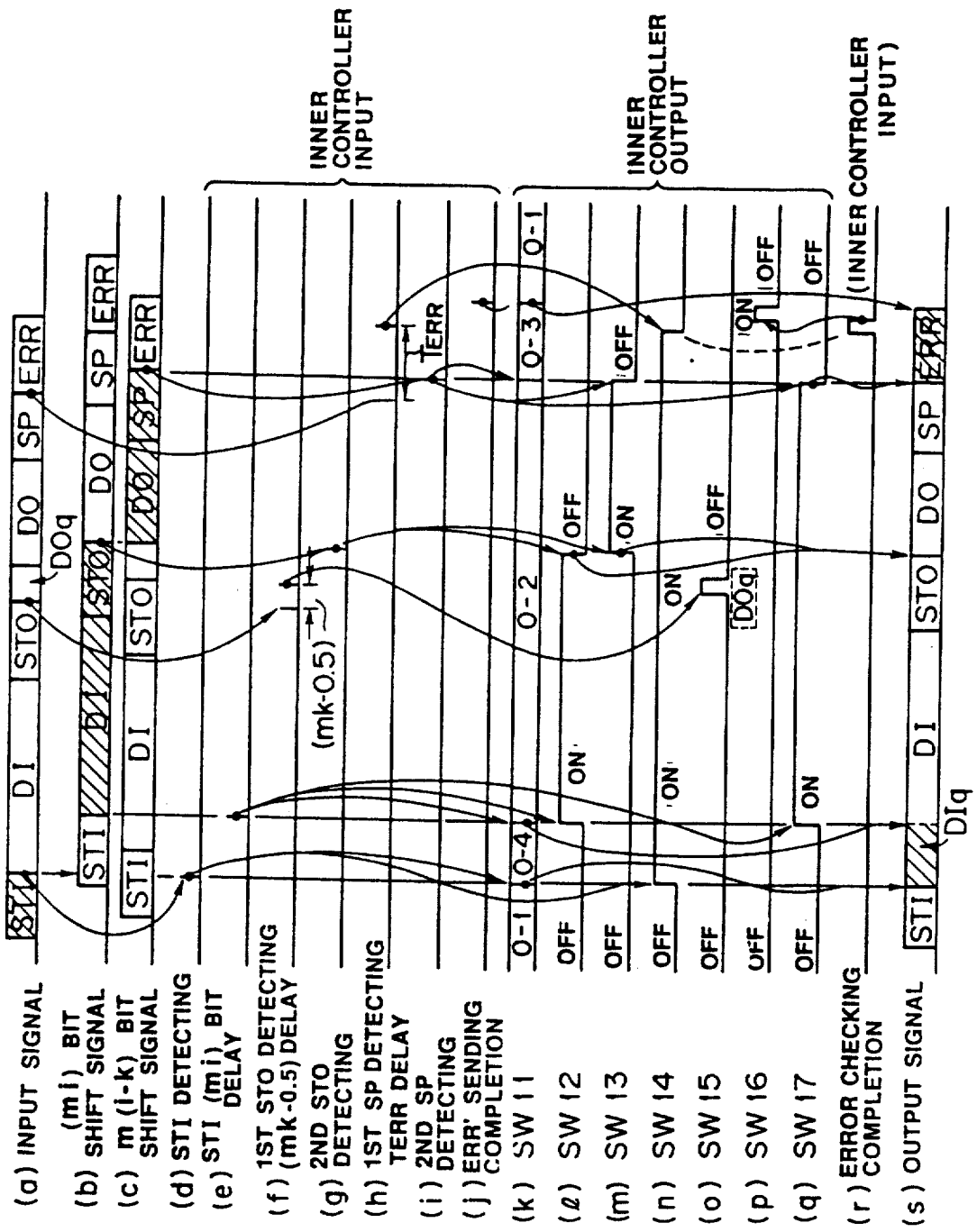

| INPUT | | STI DETECTING | STI (m i) BIT DELAY | 1ST SP TERR DELAY | 2ND SP DETECTING | ERROR CHECKING COMPLETION | ERR' SENDING COMPLETION |
|---|---|---|---|---|---|---|---|
| OUTPUT | SW21 | OFF | ON | ← | OFF | ← | ← |
| | SW22 | O-1 | O-3 | O-2 | ← | O-1 | ← |
| | SW23 | O-a | ← | ← | ← | O-b | ← | O-a |
| | SW24 | OFF | ON | ← | ← | OFF | ← | ← |

FIG. 19

| INPUT | OUTPUT | STO DETECTING | STO BIT DELAY | STO (mk) DELAY | STO (mk-0.5) DELAY | SP DETECTING | ST TERR DELAY | SP (TERR+mk) DELAY | ERROR CHECKING COMPLETION | ERR SENDING COMPLETION |
|---|---|---|---|---|---|---|---|---|---|---|
| SW31 | | OFF | ON | ↓ | ↓ | ↓ | OFF | ↓ | ↓ | ↓ |
| SW32 | | O-b | ↓ | O-a | ↓ | ↓ | ↓ | O-b | ↓ | ↓ |
| SW33 | | O-c | ↓ | ↓ | ↓ | O-d | ↓ | ↓ | ↓ | O-c |
| SW34 | | OFF | ↓ | ON | OFF | ↓ | ↓ | ↓ | ↓ | ↓ |
| SW35 | | OFF | ↓ | ↓ | NO OFF | ↓ | ↓ | ↓ | ↓ | ↓ |
| SW36 | | OFF | ↓ | ↓ | ↓ | ↓ | ↓ | ↓ | NO OFF | ↓ |

APPARATUS FOR CARRYING OUT SERIAL CONTROL

TECHNICAL FIELD

The present invention relates generally to a method and an apparatus for carrying out serial control which are preferably employable for a central control system for a press machine, a machine tool, an unmanned conveying unit or the like installation. More particularly, the present invention relates to an improvement of the structure of an apparatus preferably employable for assuring simultaneity with detection data on a number of sensors and driving data on a number of actuators used for such a control system.

BACKGROUND ART

In a case where a press, a machine tool, a construction machine, a ship, an aircraft, an unmanned conveying unit, an unmanned warehouse or the like installation are centrally controlled, a large number of sensors (limit switch, actuating button, encoder or the like) for detecting an operative state of each unit in a system and actuators (valve, relay, lamp or the like) for controlling the operative state of each unit in the system are required. In a case of, e.g., the press, the number of sensors and actuators, as mentioned above, exceeds, 3,000. With respect to some other unit, it is expected that much more than 3,000 sensors and actuators will be required.

Hitherto, a generally available central control system for centrally controlling the aforementioned kind of units is typically constructed such that a number of sensors and a number of actuators are connected directly or via relaying means to a machine controller in parallel with each other, outputs from the sensors are received in the machine controller, and the actuators are driven under proper control in response to signals from the machine controller.

In a case of the conventional central control system as mentioned above, as the number of sensors and the number of actuators become very large, the number of connecting lines for connecting the machine controller to the sensors and the actuators, as well as the total length of connecting lines extending therebetween, not only become also very large but also erroneous line connection may take place. In addition, an input/output section in the machine controller becomes very complicated in structure.

To obviate the foregoing problems, a proposal has been made as to an arrangement in which a plurality of nodes are connected to each other in series, one or a plurality of sensors and one or a plurality of actuators are connected to each node, these plural nodes are connected to one after another via a main controller in a loop-shaped configuration or in a daisychain-shaped configuration and each node is controlled in response to signals from the main controller. With such an arrangement, basically, the main controller requires only signal input lines and signal output lines connected thereto. Similarly, each node requires only signal input lines and signal output lines connected thereto. Consequently, the number of connection lines to be connected to the main controller and the time required for a wiring operation can be reduced remarkably.

A conventional technique of making serial connection, as described above, is disclosed in, e.g., an official gazette of Japanese Laid-Open Patent No. 118048/1986. According to this conventional technique, a date frame signal is composed of a synchronous slot SYN, data slots DFa to DFe for five nodes a to e, an end slot E or the like, and a data length can be fixed by unchangeably allocating the date slots DFa to DFe to the five nodes, as shown in FIG. 1. Specifically, each node is constructed such that control data DO corresponding to a plurality of actuators at the node are extracted from the data region DF corresponding to the node in an inputted data frame signal and detection data Di from a plurality of sensors at the node are introduced into the data region DF. Here, a processing to be taken for a node b will be described as an example in detail in the following. Control data DOb on own node in the data frame signal are once stored in storing means for the node b and thereafter they are fed to a plurality of actuators. Further, control data DOc, DOd and DOe on nodes subsequent to the own node are stored in other storing means and then they are additionally placed on locations behind detection data Dib derived from a plurality of relevant nodes, whereby a frame signal to be sent to a node c at the subsequent stage is created.

With the conventional technique as described above, however, when simultaneity is taken into account with respect to receiving of outputs from respective sensors connected to a plurality of node and feeding of data to a plurality of actuators connected to the nodes, the simultaneity can be realized on the basis of node in unit but it can not be assured between or among plural nodes. Namely, according to the conventional technique, after an inputted data frame signal is once stored in storing means and input/output data are then introduced/extracted, the frame signal is sent to a node at the subsequent stage. Thus, as shown in FIG. 2, a time when the data frame signals are inputted into respective nodes is deviated from a next time at least by one frame with the result that it is entirely impossible to assure the above-described simultaneity. If an arrangement is made with the conventional apparatus such that introduction of the detection data Di of the sensors into the storing means at each node and extraction of the driving data DO to be fed to the actuators from the storing means are accomplished at a same time, the simultaneity can be maintained. To this end, however, special arrangement should be made for correct time control in common with all the nodes but there arises another problem that a period of sending such data frame signal should be controlled strictly.

Further, since the conventional apparatus is constructed in such a manner that the data slots DFa to DFe of the data frame signal are unchangeably allocated to the five nodes, a position where input/output data are introduced/extracted in the data frame signal at each node is different from node to node whereby each node cannot entirely constructed with a same circuit structure. This leads to a result that the apparatus is fabricated at an increased cost.

With respect to the simultaneity of receiving data from sensors and feeding data to actuators to be driven, there occur the following malfunctions, if the simultaneity is not maintained across all the nodes.

For example, a detection value of each sensor is not limited only to one bit but in some case it has eight or more bits. However, data from the sensors each including an output line having plural bits can not necessarily be inputted into a single node but there may arise an occasion that outputs from a single sensor should be inputted across two or more nodes in dependence on limitation on the number of input data relative to a node or the like factor. In such a case, if the simultaneity of receiving data is not maintained across the respective nodes, the result is that completely incorrect data are received when sensor data vary for a period of time when data are received with deviation across the respective nodes.

With respect to actuators, there arise the following problems in addition to the aforementioned problems inherent to sensors.

In a case where a machine is provided with two or more actuators, such as clutches for controlling power, valves for controlling a flow rate or the like as actuators for driving the machine, the actuators are not necessarily controlled by a single node. Usually, they are controlled across two or more nodes. Also in such a case, if the simultaneity of feeding data across the respective nodes is not maintained, it is impossible to control the machine by simultaneously changing operative state of each of two or more actuators.

In this manner, with the system including a plurality of nodes connected to each other in series, to maintain the simultaneity of receiving data and feeding data across the respective nodes is an especially important subject from the viewpoint of assuring improved reliability of the system and extended running life of associated units and components.

The present invention has been made with the foregoing background in mind and its object resides in providing an apparatus for carrying out serial control which assures the simultaneity of receiving data and feeding data across respective nodes under a condition that all the nodes are designed and constructed with the same circuit structure.

DISCLOSURE OF THE INVENTION

According to the present invention, a controlling apparatus of the serial connection type as described above, i.e., an apparatus for carrying out serial control is constructed under one of the following assumptions.

(A) One or a plurality of first terminal components and one or a plurality of second terminal components are controlled at all nodes connected to a main controller in series.

(B) At least two kinds of nodes among three kinds of nodes, i.e., a first kind of node for controlling both the first terminal components and the second terminal components, a second kind of node for controlling only the first kind of terminal components and a third kind of node for controlling only the second terminal components, are connected to the main controller in series in a mixed state.

(C) All the nodes connected to the main controller in series control only the first terminal components.

(D) All the nodes connected to the main controller in series control only the second terminal components.

(E) In a case where all the nodes connected to the main controller in series control only the second terminal components, a node at the final stage is disconnected from the main controller and they are connected to each other in series in a so-called daisychain-shaped configuration.

Here, the first terminal component designates a terminal component such as a sensor or the like into which data are inputted and the second terminal component designates a terminal component such as an actuator or the like from which data are outputted.

According to the present invention, the main controller adds and sends a first identification code for indicating the head position relative to data derived from the first terminal components and/or a second identification code for indicating the head position relative to data derived from the second terminal components into one frame of a frame signal outputted from the main controller. Each node for controlling at least the first terminal components places data on the first terminal components controlled by itself at a location just behind the first identification code based on recognition of the first identification code in the inputted frame signal, and each node for controlling at least the second terminal components extracts data to be outputted to the second terminal components controlled by itself from a location just behind the second identification code based on recognition of the second identification code in the inputted frame signal. In this case, to assure that the head end and/or the tail end of the frame signal outputted from each node are held in a synchronous state, a part of the inputted frame signal which is not concerned directly with own node is basically outputted through each node. When data derived from the first terminal components or data to be outputted to the second terminal components are received and sent between the frame signals at each node, the node is provided with adequate shifting means depending on a length of data received and sent by itself and additionally adjusts the interior of the frame signal in connection with rebuilding of the frame signal in order that no overlapping or no spacing occurs with data elements (bit elements) constituting the frame signal.

Thus, data derived from the first terminal components and/or data to be outputted to the second terminal components are introduced into the main controller at a same time (in a case of the data derived from the first terminal components) or fed from the main controller to the second terminal components (in a case of the data to be outputted to the second terminal components). Consequently, the simultaneity required for properly controlling various machines as mentioned above is excellently maintained.

Further, according to the present invention, with a first kind of node having such a structure as mentioned in paragraph (A) or paragraph (B), in a case where data derived from the first terminal components and data to be outputted to the second terminal components are different from each other in length, each node includes shifting means suitable for compensating the difference in data length. Also in this case, arrangement is made such that no overlapping or no spacing occurs with the data elements (bit elements) in each frame signal outputted from each node. Also in this case, of course, the head end and/or the tail end of a frame signal outputted from each node are held in a synchronous state in the same manner as mentioned above.

Thus, even in case where data derived from the first terminal components and data to be outputted to the second terminal components are different from each other in data length, the desired simultaneity is maintained in the same manner as mentioned above with respect to one of the data derived from the first terminal components and the data to be outputted to the second terminal components.

BRIEF DESCRIPTION OF THE DRAWINGS

FIG. 9 shows a plurality of time charts which illustrate by way of example operations of each circuit in the node controller in accordance with the second embodiment of the present invention.

FIG. 19 is an explanatory view which schematically illustrates functions of the inner controller in accordance with the fifth embodiment of the present invention.

BEST MODE FOR CARRYING OUT THE INVENTION

The present invention will be described in detail hereinafter with reference to the accompanying drawings which illustrate preferred embodiments thereof.

Figure 1:
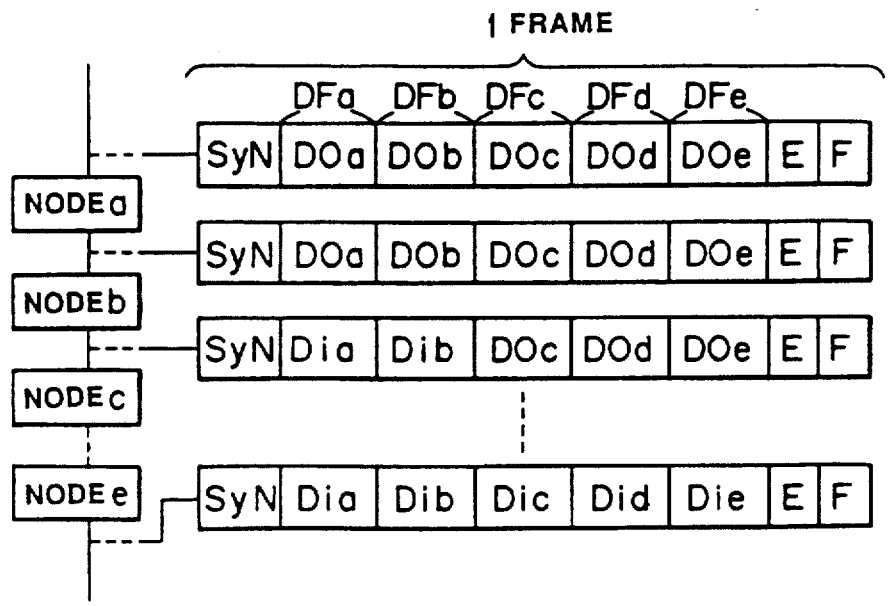
FIGS. 1 and 2 are a schematic view, respectively, which illustrates the outline of conventional prior art apparatus and method for carrying out serial control.
Figure 2:
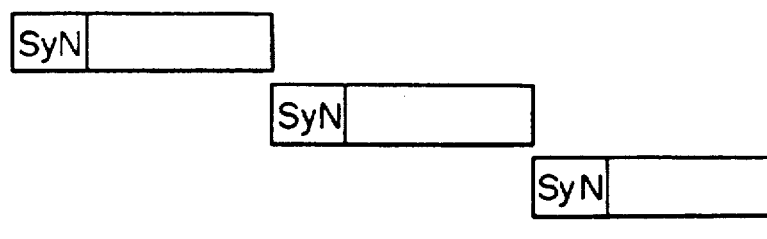
Figure 3:
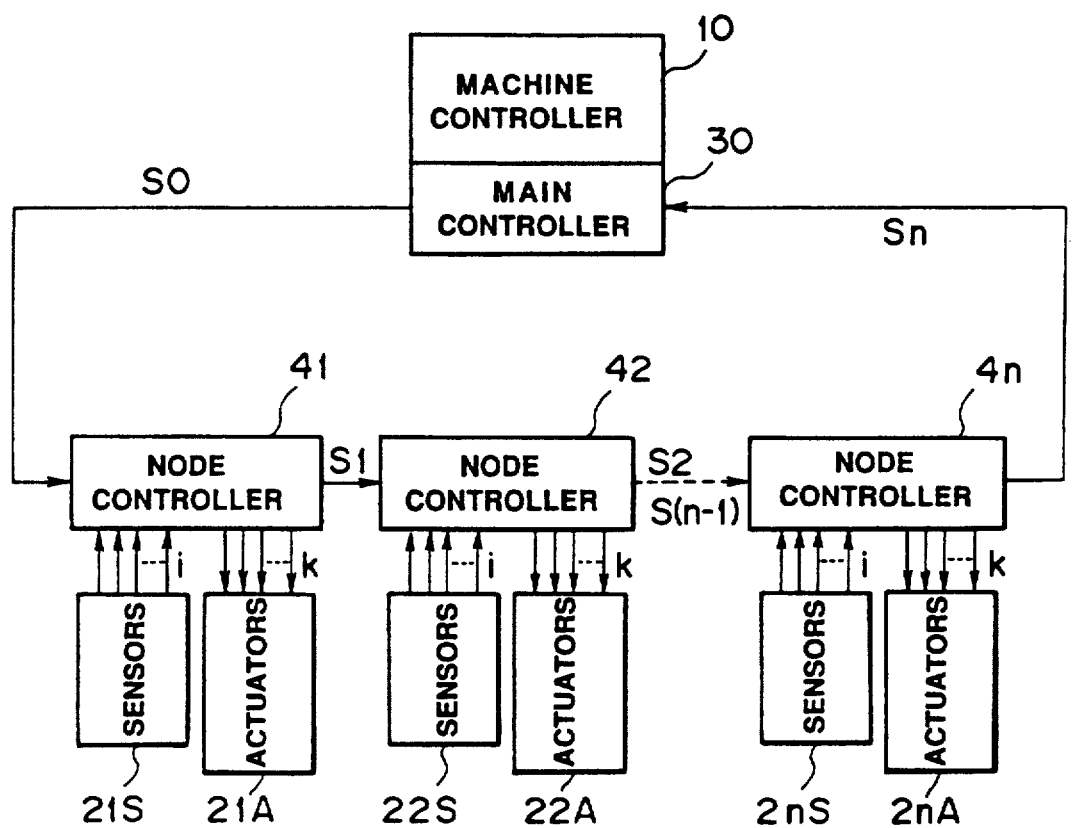
FIG. 3 is a block diagram which schematically illustrates the whole structure of an apparatus for carrying out serial control in accordance with an embodiment of the present invention.

FIG. 3 is a block diagram which schematically illustrates by way of example the whole structure of an apparatus for carrying out serial control in accordance with an embodiment of the present invention. In the illustrated case, the apparatus is employed for a central control system for, e.g., a press machine.

Referring to FIG. 3, a group of sensors $21s$ to $2ns$ correspond to a variety of sensors for a limit switch, an actuating button, an operative state detecting sensor, an encoder or the like components disposed in respective sections of the press machine. Data outputted from these sensors are divided into a number of groups each of which includes data comprising i bits, and the thus divided data are inputted into a number n of node controllers 41 to $4n$. On the other hand, a group of actuators 21A to $2n$A correspond to a variety of actuators for a valve, a relay, a lamp or the like components disposed in the press machine. Output data to be outputted to these actuators are divided into a number n of groups each of which includes data comprising k bits, and the thus divided data are outputted from a number n of node controllers 41 to $4n$. Thus, the respective node controllers 41 to $4n$ are connected to the group of sensors via connecting lines each having a capacity of i bits, while the respective node controllers 41 to $4n$ are connected the group of actuators via connecting lines each having a capacity of k bits.

A main controller 30 is provided adjacent to a machine controller 10 which centrally controls operations of the press machine. The main controller 30 serves to collect data outputted from the group of sensors $21s$ to $2ns$ and deliver a variety of control data to the group of actuators 21A to $2n$A. Each node controller connected to the main controller 30 serves to relay data for the group of sensors and the group of actuators connected thereto. The interior of each node controller is filled with hardware only. As is apparent from FIG. 3, the main controller 30 and the respective node controllers 41 to $4n$ are connected to each other in series in a loop-shaped configuration via suitable signal lines.

Specifically, with the system of the apparatus of the present invention shown in FIG. 3, a signal having a predetermined frame structure and including actuator control data is first sent from the main controller 30 to the nearest node controller 41. Then, the frame signal is successively transmitted to the main controller 30 in an order of the node controller 41, the node controller 42, the node controller $4n$ and the main controller 30, whereby necessary actuator control data included in the frame signal are distributed to each relevant node controller and at the same time detection data derived from the group of sensors are taken in the frame signal at the relevant node controller 30. As a result, when the frame signal returns to the main controller, it does not include any actuator control data but includes detection data derived from the group of sensors.

(A) For the sake of convenience of illustration of the system structure for the apparatus of the present invention, FIG. 3 illustrates only the system structure wherein all the node controllers connected to the main controller in series control the group of sensors as well as the group of actuators. However, the present invention should not be limited to the above-described system structure but another modified system structure will be described in the following paragraphs.

(B) At least two kinds of node controllers among three kinds of node controllers, i.e., a first kind of node controller for controlling a group of sensors as well as a group of actuators, a second kind of node controller for controlling the group of sensors only and a third kind of node controllers for controlling the group of actuators only are available in a mixed state and they are connected to the main controller.

(C) All the node controller connected to the main controller in series control the group of sensors only.

(D) All the node controllers connected to the main controller in series controls the group of actuators only.

(E) All the node controllers connected to the main controller control the group of actuators only but the node controller 4n at the final stage is disconnected from the main controller 30. Thus, all the node controller are connected to each other in series in a so-called daisychain-shaped configuration.

The above-described system structures are selectively employed in consideration of the current operative state of a machine to which the present invention is applied.

The present invention has been described above with respect to a case where a plurality of sensors or a plurality of actuators are divided into plural groups each of which is controlled by each node controller. Alternatively, these sensors or actuators may individually be controlled by a single node controller.

Next, a method of transmitting signals from a main controller preferably employed for the apparatus of the present invention to each node controller and vice versa, i.e., a protocol for transmitting signals in that way will be described below with reference to FIG. 4.

"STI", "DI", "DIq", "STO", "DO", "DOq", "SP" and "ERR" in respective signal frames shown in FIG. 4 will itemwise be explained below.

STI: This item designates a start code for input data which have previously be fed to a frame from the main controller as a bit row having a predetermined logical structure so as to indicate the head position for data to be inputted (sensor data).

DI: This item designates an input data row to be taken in the frame via each node controller.

DIq, This item designates NO. q input data (row) to be taken in the frame via a NO. q node controller.

STO: This item designates a start code for output data which have previously been fed to the frame from the main controller as a bit row having a predetermined logical structure different from, that of "STI" so as to indicate the head position for data to be outputted (actuator control data).

DO: This item designates an output data row to be extracted from the frame via each node controller. The output data raw is outputted from the main controller subsequent to "STO".

DOq: This item designates NO. q output data (row) to be extracted from the frame via the NO. q node controller.

SP: This item designates a stop code which has previously been fed to the frame from the main controller as a bit row having a predetermined logical structure different from that of "STI" or "STO" so as to indicate the tail position for a data row present in the frame or to be taken from the frame.

ERR: This item designates a code comprising a predetermined bit row so as to allow a controller at the subsequent stage to positively take an adequate measure of processing for a data error during transmission of the frame signal, i.e., an error processing code. Here, mainly an error check code to be created and fed by the main controller and each node controller by themselves based on the content of a data row to be transmitted to the subsequent stage as a code for checking whether a data error occurs or not during transmission of the frame signal is supposed.

Various kinds of protocols to be practiced with the apparatus for carrying out serial control in accordance with the present invention will be described in more details in the following.

Here, for the sake of convenience of description, a process of receiving and extracting data in the NO. q node controller 4q located at the qth stage counted from the first node controller 41 will be exemplified with respect to the structure of a node controller.

(a) A process wherein the structure of a node controller is determined such that in a case where the frame signal is transmitted in an order of "STI" and "STO" as time elapses, the "STI" of the frame signal which has been inputted is detected, "DIq" representative of input data (sensor data) or an input data row of the frame signal is fed immediately after the detection of the "STI" of the frame signal, the "STO" of the frame signal is detected and then "DOq" representative of output data (actuator control data) or an output data row of the frame signal is extracted immediately after the detection of the "STO" of the frame signal (see FIG. 4(a)).

(b) A process wherein the structure of a node controller is determined such that in a case where the frame signal is likewise transmitted in an order of "STI" and "STO", the "STO" of the frame signal which has been inputted is detected, "DIq" representative of input data or an input data row of the frame signal is fed just before the detection of the "STO" of the frame signal, the "STO" of the frame signal is detected and then "DOq" representative of output data or an output data row of the frame signal is extracted immediately after the detection of the "STO" of the frame signal (see FIG. 4(b)).

(c) A process wherein the structure of a node controller is determined such that in a case where the frame signal is likewise transmitted in an order of "STI" and "STO", the "STI" of the frame signal which has been inputted is detected, "DIq" representative of input data or an input data row of the frame signal is fed immediately after the detection of the "STI" of the frame signal, "SP" of the frame signal is detected and "DOq" representative of output data or an output data row of the frame signal is extracted just before the detection of the "SP" of the frame signal (see FIG. 4(c)).

(d) A process wherein the structure of a node controller is determined such that in a case where the frame signal is transmitted in an order of "STO" and "STI" as time elapses, the "STO" of the frame signal which has been inputted is detected, "DOq" representative of output data or an output data row of the frame signal is extracted immediately after the detection of the "STO" of the frame signal, the "STI" of the frame signal is detected and then "DIq" representative of input data or an input data row of the frame signal is fed immediately after the detection of the "STI" of the frame signal (see FIG. 4(d)).

(e) A process wherein the structure of a node controller is determined such that in a case where the frame signal is likewise transmitted in an order of "STO" and "STI", the "STI" of the frame signal which has been inputted is detected, "DOq" representative of output data or an output data row of the frame signal is extracted just before the detection of the "STI" of the frame signal, the "STI" of the frame signal is detected and then "DIq" representative of input data or an input data row of the frame signal is fed immediately after the detection of the "STI" of the frame signal (see FIG. 4(e)).

(f) A process wherein the structure of a node controller is determined such that in a case where the frame signal is likewise transmitted in an order of "STO" and "STI", the "STO" of the frame signal which has been inputted is detected, "DOq" representative of output data or an output data row of the frame signal is extracted immediately after the detection of the "STO" of the frame signal the "SP" of the frame signal is detected and "DIq" representative of input data or an input data row of the frame signal is fed just before the detection of the "SP" of the frame signal (see FIG. 4(f)).

(g) A process particularly employable for the apparatus for carrying out serial control as explained in the above-described paragraph (C) wherein the structure of a node controller is determined such that in a case where only "STI", "SP" and "ERR" are transmitted from the main controller 30, the "STI" of the frame signal which has been inputted is detected and then "DIq" representative of input data or an input data row of the frame signal is added immediately after the detection of the "STI" of the frame signal (see FIG. 4(g)).

(h) A process particularly employable for the apparatus for carrying out serial control as explained in the above-described paragraphs (D) and (E) wherein the structure of a node controller is determined such that in a case where only "STO", "DO", "SP" and "ERR" are transmitted from the main controller 30, the "STO" of the frame signal which has been inputted is detected and then "DOq" representative of an output data or an output data row is extracted immediately after the detection of the "STO" of the frame signal (see FIG. 4(h)).

With respect to the apparatus of the present invention, one of eight kinds of protocols as explained in the above-described paragraphs (a) to (h) is selectively selected in dependence on the structure of the apparatus as explained in the above-described paragraphs (A) to (E). Transmission of data from the main controller to each node controller and vice versa can satisfactorily be achieved for the apparatus of the present invention, as required. From the viewpoint of practicability, transmission of data from the main controller to each node controller and vice versa is repeated with a sufficiently short period so as to smoothly control a series of operations of a machine such as a press or the like to which the present invention is applied.

It is assumed that an ON/OFF sensor adapted to output an one bit signal as a logic value of "1" or "0" is employed for the aforementioned sensors and moreover a binary value-driven actuator adapted to operate in response to an one bit driving signal comprising a logical value of "1" or "0" is employed for the aforementioned actuators. In view of the above-described convenience, according to the embodiment of the present invention, in a case where "STI", "STO" and "SP" are constructed with the logical structure, e.g., as shown in Table 1 noted below, data installed on the frame signal (e.g., "DI", "DIq", "DO" and "DOq") in relation to control data for these sensors and actuators are constructed as shown in Table 2 so that "STI", "STO" and "SP" can reliably be identified irrespective of how these data are arranged in the form of a row.

TABLE 1

| code | logical structure (eight bits) |
|------|-------------------------------|
| STI  | 01111100 |
| STO  | 01111110 |
| SP   | 01111111 |

TABLE 2

| practical data | | control data for sensors or actuator | |
|---|---|---|---|
| | | 1 | 2 |
| data installed on frame | example 1 | 01 | 00 |
| | example 2 | 001 | 000 |
| | example 3 | 0001 | 0000 |
| | example 4 | 0011 | 0001 |
| | example 5 | 10 | 01 |
| | example 6 | 10 | 00 |

Incidentally, in a case where the structure of "STI", "STO" and "SP" is as shown in table 1, one bit data of "1" or "0" as seen in the column of practical data can be used as data installed on a frame only when the number of connectedness of on-data (data of logical value "1") is less than "5" (less than "4" with respect to an output from a node controller at the preceding stage).

A code having a fixed length, e.g. 16 bits can be provided for "ERR" as mentioned above it should be noted that the content of the code varies depending on the content of the present data row.

According to this system, data transmission between adjacent node controllers is accomplished using CMI (Coded Mark Inversion) codes or DMI codes. This is intended to minimize incorrect transmission due to noise or the like appearing in the course of transmission and make it possible to reproduce (extract) clock signals in each node controller.

Figure 5:
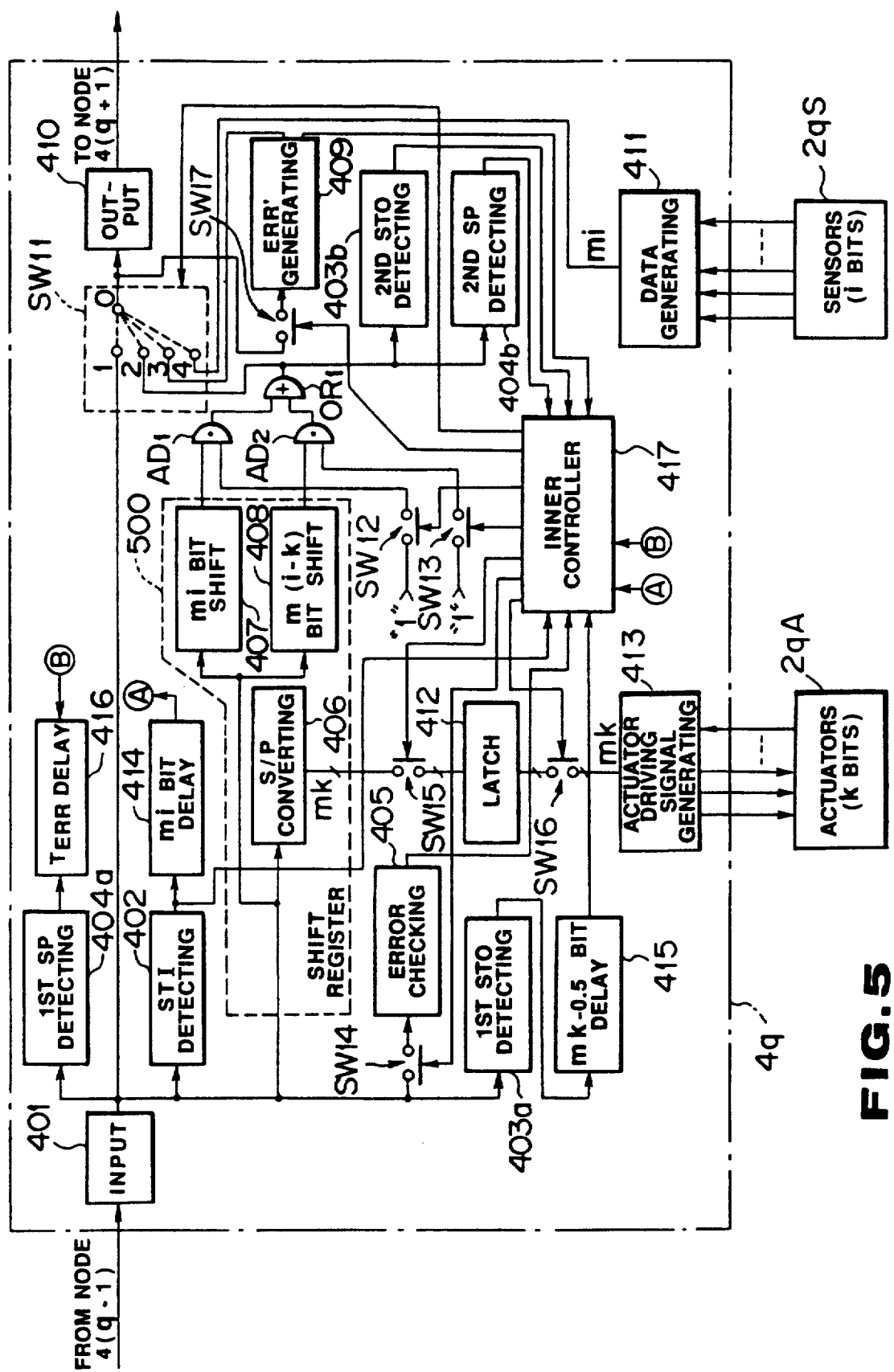
FIG. 5 is a block diagram which illustrates by way of example the circuit structure of a node controller used for first and second embodiments of the present invention.

FIG. 5 illustrates by way of example the structure of a preferable node controller adapted to control a group of sensors and a group of actuators in a case where the structure as mentioned in the above-described paragraph (A) or (B) as well as the protocol as mentioned in the above-described paragraph (b) are employed for the apparatus of the present invention.

FIG. 5 is a block diagram which illustrates by way of example the detailed structure of a NO. q node controller 4q located at a qth location as counted from the first node controller 41. Obviously, other node controllers 41 to 4n are constructed in the same manner as that of the node controller 4q.

An input circuit 401 receives a frame signal from the node controller 4(q−1) at the preceding stage, and the signal which has been modulated by the received CMI signal is remodulated to a NRZ (Non Return Zero) code corresponding to normal "1" and "0".

A STI detecting circuit 402 detects a "STI" code situated at the head portion of the remodulated frame signal (see FIG. 4) and the resultant detection output is inputted into a mi bit delay circuit 414 and an inner controller 417.

The mi delay circuit 414 serves to delay the signal detected in the STI detecting circuit 402 by mi bits and the resultant delay signal is inputted into the inner controller 417. It should be noted that i designates the number of bits for a group of sensors which are to be inputted into each node controller and m designates a ratio of the data row length installed on the frame signal to an actual data row length (see Table 2). Specifically, in the case of Example 1, Example 5 and Example 6 in Table 2, m is equal to 2, in the case of Example 2, m is equal to 3 and in the case of Example 3 and Example 4, m is equal to 4.

A first STO detecting circuit 403a detects a "STO" code in the frame signal remodulated by the input circuit 401 (see FIG. 4) and the detection output from the first STO detecting circuit 403a is inputted into a (mk−0.5) bit delay circuit 415.

The (mk−0.5) bit delay circuit 415 delays the detection signal from the STO detecting circuit 403a by (mk−0.5) bits and the resultant delay signal is inputted into the inner controller 417. Here, k designates the number of bits available for a group of actuators connected to each node controller.

A first SP detecting circuit 404a detects a "SP" code in the frame signal (see FIG. 4) and the detection output from the first SP detecting circuit 404a is inputted into a $T_{ERR}$ delay circuit 416.

The $T_{ERR}$ delay circuit 416 delays a detection signal from the first SP detecting circuit 404a by a period of time $T_{ERR}$ corresponding to the number of bits available for an "ERR" code (see FIG. 4) and the delay signal from the $T_{ERR}$ delay circuit 416 is inputted into the inner controller 417.

An error check circuit 405 compares the "ERR" code in the frame signal with data rows DI and DO by employing a CRC check, a parity check or the like to detect whether or not an error occurs with the signal transmitted from the node controller 4(q−1) at the preceding stage so that the content of the inspection is inputted into a content controller 417.

A serial/parallel converting circuit (S/P converting circuit) 406 serves as a shift register having, e.g., mk bits, and a parallel output representative of the mk bits is inputted into a latch circuit 412 via a switch circuit SW 15. The latch circuit 412 latches an output from the S/P converting circuit 40, when the switch circuit SW 15 is turned on. An output from the latch circuit 412 is inputted into an actuator driving signal generating circuit 413 via a switch circuit SW 16. The actuator driving signal generating circuit 413 receives latch data (each having mk bits) derived from the latch circuit 412 with a timing for allowing the switch circuit SW 16 to be turned on, and the latch data are converted into actuator driving signals each having k bits.

A mi bit shift circuit 407 delays the frame signal remodulated by the input circuit 401 by mi bits, and the thus delayed frame signal is inputted into an AND gate $AD_1$.

A m(i−k) bit shift circuit 407 delays the frame signal remodulated by the input circuit 401 by m (i−k) bits, and the thus delayed frame signal is inputted into an AND gate $AD_2$.

It should be noted that signals "1" and "0" are inputted into the AND gate $AD_1$ corresponding to on/off of a switch circuit 12. Things are same with the AND gate $AD_2$ such that signals "1" and "0" are inputted into the AND gate $AD_2$ corresponding to on/off of a switch circuit SW 13. Outputs from the AND gates $AD_1$ and $AD_2$ are inputted into an OR gate $OR_1$. Namely, arrangement of the gates $AD_1$, $AD_2$ and $OR_1$ constitutes a selector circuit so that in response to an output from the OR gate $OR_1$, the mi bit shift circuit circuit 407 side is selected when the switch circuit SW12 is turned on and the m(i−k) bit shift circuit 408 side is selected when the switch circuit SW 13 is turned on.

An ERR' generating circuit 409 generates and outputs a new code "ERR'" code in place of the foregoing "ERR" code for the purpose of checking, based on data rows D1 and D0 in the frame signal outputted from the node controller 4q, whether an error occurs or not with a node controller 4(q+1) at the subsequent stage. The "ERR'" code is fed to a switch circuit SW11 to detect a "SP" code in the frame signal. Then, an "ERR'" sending completion signal derived by delaying the resultant detection signal by bits equal to the "ERR'" code is outputted to the inner controller 417.

A second STO detecting circuit 403b detects a "STO" code in the frame signal outputted from the OR gate $OR_1$ and the detection signal is outputted to the inner controller 417. Similarly, a second SP detecting circuit 404b detects the "SP" code in the frame signal outputted from the OR gate $OR_1$ so that the detection signal is outputted to the inner controller 417.

A data generating circuit 411 converts sensor outputs each outputted from a group of sensors $2_{qs}$ and having i bits into serial data each installed on the frame signal and having mi bits and the resultant serial data are fed to the switch circuit SW11.

In response to a signal from the inner controller 417, the switch circuit SW11 selectively switches outputs from the input circuit 401, the OR gate $OR_1$, the "ERR'" generating circuit 409 and the data generating circuit 411 and the switched output is outputted to an output circuit 410.

The output circuit 410 executes a processing of modulation for converting the signal delivered from the switch circuit SW11 into coded mark inversion signal (CMI signal) and the modulated CMI signal is outputted to the node controller 4(q+1) at the subsequent stage.

The inner controller 417 receives outputs from the STI detection circuit 402, the mi bit delay circuit 414, the mk bit delay circuit 415, the second STO detecting circuit 403b, the $T_{ERR}$ delay circuit 416 and the second SP detecting circuit 404b, an error check completion signal from the error checking circuit 405 and an ERR' sending completion signal from the ERR' generating circuit 409, whereby the first to seventh switch circuits SW11 to SW17 in the node controller q are changed under a correct control.

With such construction, to assure that all the node controllers perform a controlling operation that receipt of sensor data and delivery of data to each node controller are simultaneously accomplished with them, the bit number i of a group of sensors connected to each controller is equalized to the bit number k of a group of actuators, i.e., i=k. Thus, in this case, the m(i−k) bit shift circuit 408 has the shift bit number of zero.

Next, operations of the node controller 4q will be described below under the foregoing condition of i=k with reference to FIGS. 6 and 7 which show a plurality of time charts, respectively.

Figures 6, 8:
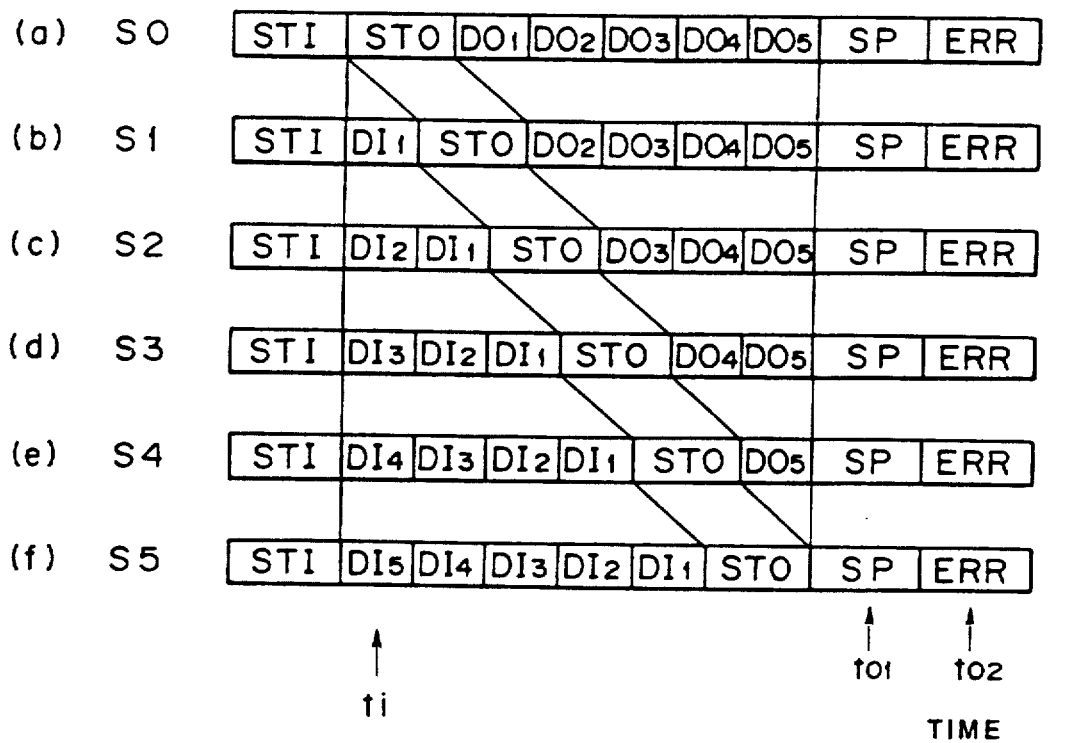
FIG. 6 is an explanatory view which schematically illustrates functions of an inner controller in accordance with the first and second embodiments of the present invention.
FIG. 8 shows a plurality of time charts which illustrate a process by way of which a frame signal is propagated in accordance with the first embodiment of the present invention.

Specifically, FIG. 6 is a diagram which shows an input/output logic of the inner controller 417 in the node controller 4q shown in FIG. 5. (It should be noted that the inner controller includes a circuit in which a control logic provided therefor is previously incorporated with such input/output properties as shown in the diagram.)

First, while the inner controller 417 is held in an initial state wherein no frame signal is inputted, contacts in the switch circuit SW11 are connected to the inner controller 417 in a 0-1 state but all the other switch circuits SW12 to 17 are turned off.

When a frame signal is inputted into the input circuit 401 while the foregoing state is maintained, a "STI" code in the frame signal is outputted to the node controller 4(q+1) at the subsequent stage via the output circuit 401 as it is left unchanged (see FIG. 7(s)). On the other hand, the STI detecting circuit 402 detects a "STI" code at a time point $t_1$ when the tail end of the "STI" code is inputted thereinto, whereby the detection signal is inputted into the inner controller 417 (see FIG. 7(d)). In response to inputting of the detection signal, the inner controller 417 allows the contacts in the switch circuit SW11 to be connected thereto in a 0-4 state and thereby the switches 14 and the switch 17 are turned on (at the time $t_1$, see FIGS. 7(k) and (n)). As a result, a "DI" code and other subsequent ones in the frame signal are inputted into the error checking circuit 405, and after an "ERR" code is inputted, the inner controller 417 performs an error checking operation as mentioned above. Detection data (having i bits) from a group of sensors 2qs inputted into the data generating circuit 411 are converted into serial data DIq having mi bits in the data generating circuit 411 so that the serial data DIq are outputted to the node controller 4(q+1) at the subsequent stage via the switch circuit SW11 and the output circuit 410 (at the time $t_1$ and at a time $t_2$, see FIG. 7(s)).

Figure 7:
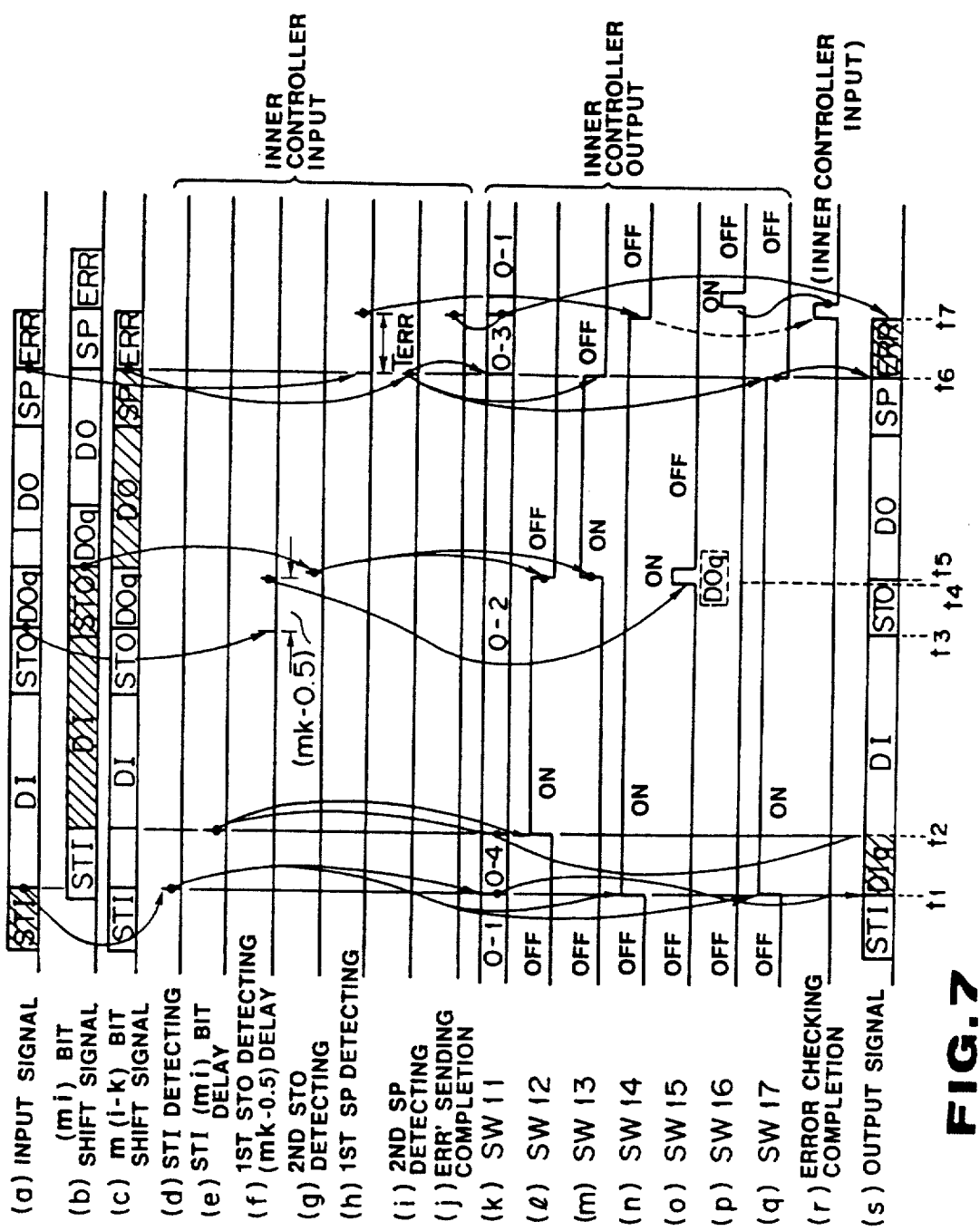
FIG. 7 shows a plurality of time charts which illustrate by way of example operations of each circuit in the node controller in accordance with the first embodiment of the present invention.

On the other hand, the mi bit shift circuit 407 delays the frame signal by mi bits, i.e., by a length equal to bits included in the sensor data DIq (see FIG. 7(b)). The mi bit delay circuit 414 delays a detection signal from the STI detecting circuit 402 (at the time $t_1$) by mi bits and the detection signal is inputted into the inner controller 417 (at the time $t_2$, see FIG. 7(e)). Thus, the inner controller 407 allows contacts in the switch circuit SW11 to be connected thereto in an 0-2 state, whereby the switch circuit SW12 is turned on (at the time $t_2$, see FIGS. 7 (k), (l) and (q). As a result, a delay output from the mi bit shift circuit 407 is later selected in the switch circuit SW11 and an output from the switch circuit SW11 is inputted into the ERR' generating circuit 409.

Thereafter, the first STO detecting circuit 403a detects a "STO" code at a time point (time $t_3$) when the tail end of the "STO" code in the frame signal to be outputted from the input circuit 401 is inputted thereinto and the detection signal is then inputted into the (mk−0.5) bit delay circuit 416. The (mk−0.5) bit delay circuit 416 delays the detection signal by (mk−0.5) bits, i.e., for a period of time appreciably shorter than a bit length mk of the actuator data DOq and the resultant delay signal is inputted in the inner controller 417 (at a time $t_4$, see FIG. 7(f)). Thus, the inner controller 417 causes the switch circuit SW15 to be turned on. At this time, data present in the S/P conversion circuit 406 are latched in the latch circuit 412 (at the time $t_4$, see FIG. 7(o)). As is apparent from FIG. 7, the actuator data DOq in the relevant node controller are present in a mk bit parallel output from the S/P conversion circuit 406 at the time $t_4$ with the result that the actuator data DOq having mk bits are latched in the latch circuit 412.

On the other hand, the second STO detecting circuit 403b detects a "STO" code in the frame signal which has been shifted by mi bits in the mk bit shift circuit 407 and the resultant signal is then inputted into the inner controller 417 (at a time $t_5$). This permits the inner controller 417 to turn on the switch circuit SW12 and turn off the switch circuit SW13 (see FIGS. 7(l) and (m)). Consequently, an output from the m(k−i) bit shift circuit 408, i.e., a frame signal having no delay is outputted from the OR gate OR$_1$ later than the time $t_5$, whereby the frame signal is fed to the switch circuit SW11, the ERR' circuit 409 and the second SP detecting circuit 404b.

This state continues till a time $t_6$ when a "SP" code is detected by the second SP detecting circuit 404b. Namely, the second SP detecting circuit 404b detects the "SP" code in the frame signal at the time $t_6$ and the resultant detection signal is inputted into the inner controller 417. This allows the inner controller 417 to shift the contacts in the switch circuit SW11 to a 0-3 state and turn off the switch circuits SW13 and SW17 at the time $t_6$ (see FIGS. 7(k), (m) and (q)).

Consequently, for a period of time of $t_2$ to $t_5$, a sensor data row DI and a "STO" code corresponding to other node controller (exactly speaking, a node controller located before the preceding stage) in the frame signal which has been delayed by mi bits in the circuit 407 are outputted from the switch circuit SW11, while for a period of time of $t_5$ to $t_6$, an actuator date DO and a "SP" code corresponding to other node controller (exactly speaking, a node controller located after the subsequent stage) in the frame signal which has no delay are outputted from the switch circuit SW 11. These "DI", "STO", "DO" and "SP" codes are outputted to the node controller 4(q+1) at the subsequent stage.

In response to shifting of the switch circuit SW11 to a 0-3 state at a time $t_6$, an "ERR" code generated in the ERR' generating circuit 409 is outputted later than the time $t_6$. The "ERR" code continues to be delivered till a time $t_7$ when ERR' sending completion is detected by the ERR' generating circuit 409. Namely, when the "ERR'" code sending completion is detected in that way, the ERR' generating circuit 409 allows the detection signal to be inputted into the inner controller 417 (at the time $t_7$, see FIG. 7(j)). This causes the inner controller 417 to shift the contacts in the switch circuit SW11 to a 0-1 state at the time $t_7$. Consequently, the switch circuit SW11 is brought in a waiting state so that it is ready to permit a "STI" code in the next frame signal to be inputted thereinto.

On the other hand, the first SP detecting circuit 404a detects a "SP" code in the frame signal outputted from the input circuit 410 at the time $t_6$ and the detection signal $T_{ERR}$ is then inputted into a $T_{ERR}$ delay circuit 416. The $T_{ERR}$ delay circuit 416 delays the detection signal by an extent equal to the number of bits representative of the "ERR" code and the resultant delay signal is inputted into the inner controller 417 (at the time $t_7$, see FIG. 7(h)). This causes the inner controller 417 to turn on a switch circuit SW14 at the time $t_1$. An error checking circuit 405 performs an error checking operation with respect to DI, DO and SRO codes representative of a data row inputted for a period of time $t_1$ to $t_6$ as well as an "ERR" code inputted for a period of time of t6 to t7, and in a case where it is found that there are present a signal indicative of completion of the error checking operation as well as an error, the content of the error is inputted into the inner controller 417 (see FIG. 7(r)). The inner controller 417 causes a switch circuit SW16 to be turned on only when a normal signal indicative of completion of the error checking operation is inputted thereinto, whereby latch data from a latch circuit 412 are received in an actuator driving signal generating circuit 413 (see FIG. 7(p)). Therefore, an incorrect operation of the group of actuators due to abnormal data can completely be prevented.

FIG. 8 shows a plurality of time charts which illustrate how the frame signal is transformed with the apparatus in accordance with the above-described embodiment of the present invention as time elapses. In the shown case, the number of node controllers is limited to 5 for the purpose of simplification of description. Specifically, FIG. 8(a) shows a signal immediately after it is outputted from the main controller 30, FIGS. 8 (b), (c), (d) and (e) show signals which are outputted from node controllers 41, 42, 43 and 44 and FIG. 8(f) shows a signal to be outputted from the node controller 45 (i.e., a signal to be fed back to the main controller 30 and inputted into the latter).

As will be apparent from the drawing, according to this embodiment of the present invention, the number of input data to be connected to each node (the number of bits representative of sensor data) i is equalized to the number of output data (the number of bits representative of actuator data) k, i.e., k=i. Thus, all the sensor data are received in the frame signal at each node at a same time ($t_i$). This assures that data are simultaneously received without fail and the "SP" code and the "ERR" code are received at a completely same time ($t_{01}$, $t_{01}$) at each node, whereby the switch circuit SW15 and SW16 are turned on at a same time at each node. Accordingly, this assures that data distribution is preferably accomplished with simultaneity.

Next, an apparatus for carrying our serial control in accordance with a second embodiment of the present invention will be described below with reference to FIG. 9 and FIG. 10.

According to the second embodiment of the present invention, to assure that data (sensor data) are inputted with simultaneity, a controller at each node is constructed such that the number of input data are larger than the number of output data, i.e., i is set larger than k.

In the case of the second embodiment, the construction of the controller at each node is entirely same as that of the circuit system shown in FIG. 5 and moreover shifting of the switch circuits SW11 to 17 by the inner controller 417 is controlled in the same manner as that shown in FIG. 6. Although the m(i−k) bit shaft circuit 408 does not practically perform any operation because of a condition of k=i in the aforementioned first embodiment of the present invention, the m(i−k) bit shift circuit 408 performs a shifting operation by m(i−k) bits in this second embodiment of the present invention.

Specifically, FIG. 9 shows a plurality of timing charts which illustrate operations of circuits in a node controller 4q in accordance with the second embodiment of the present invention. It should be noted that there is no substantial difference between the time chart shown in FIG. 7 and those shown in FIG. 9. According to the second embodiment of the present invention, an inputted shaft frame is delayed by m(i−k) bits in the m(i−k) bits shift circuit 408, whereby the tail end of a "STO" code outputted via the mi bit shift circuit 407 coincide with the head end of a "DO" signal outputted via the m(i−k) bit shift circuit 408 in respect of time. This represents an operation which has not been performed in the first embodiment of the present invention.

Figures 10, 12:
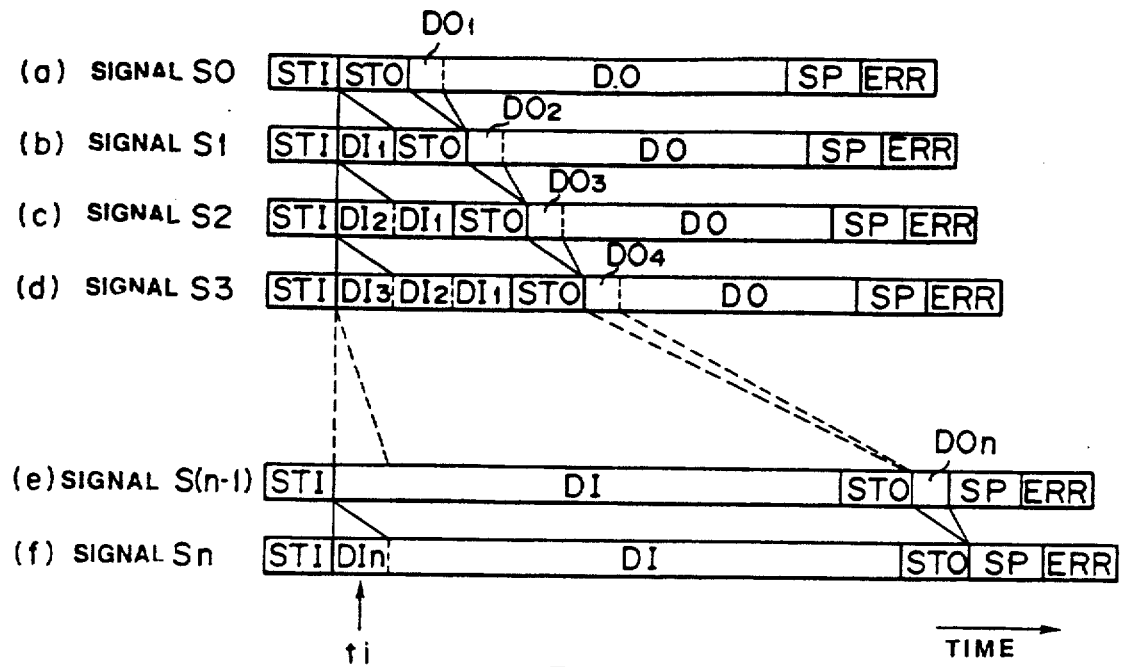
FIG. 10 shows a plurality of time charts which illustrate a process by way of which a frame signal is propagated in accordance with the second embodiment of the present invention.
FIG. 12 is an explanatory view which schematically illustrate functions of an inner controller in accordance with the third embodiment of the present invention.

FIG. 10 shows a plurality of time charts which illustrate how the frame signal in the second embodiment of the present invention is transferred as time elapses. According to the second embodiment of the present invention, since i is set larger than k, receipt of sensor data in the frame signal is carried out at the same time point of $t_i$ at each node in the same manner as in the first embodiment of the present invention. This assures that data receipt is accomplished with simultaneity.

Next, an apparatus for carrying out serial control in accordance with a third embodiment of the present invention will be described below with reference to FIGS. 11 to 14.

According to the third embodiment of the present invention, to assure that data (actuator data) are outputted with simultaneity, the number of input data is smaller than the number of output data at each node controller, i.e., i is set smaller than k.

Figure 11:
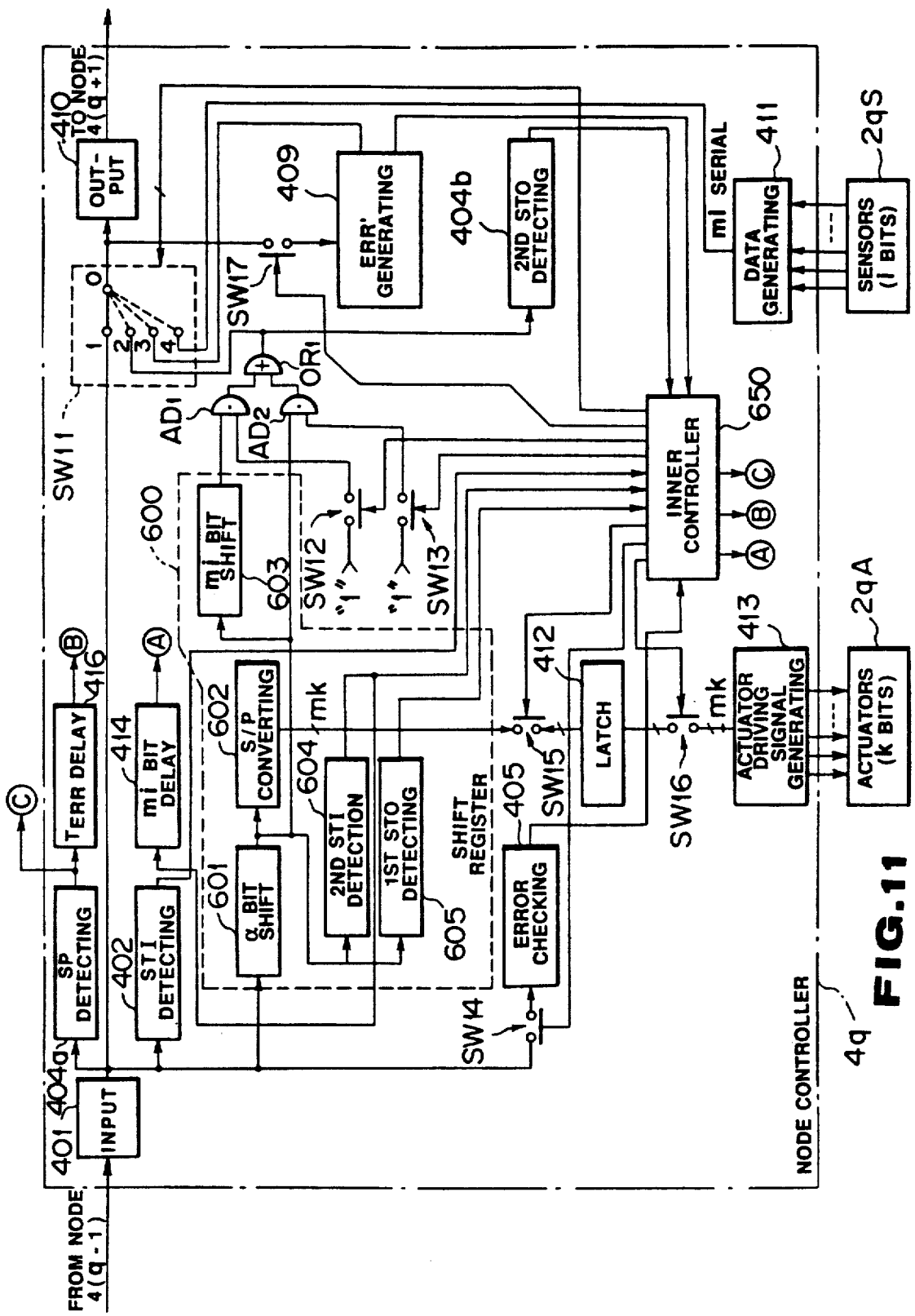
FIG. 11 is a block diagram which illustrates by way of example the circuit structure of a node controller used for the apparatus in accordance with a third embodiment of the present invention.

FIG. 11 is a block diagram which illustrates by way of example the inner structure of each node controller in accordance with the third embodiment of the present invention.

Accordance to the third embodiment of the present invention, the node controller is constructed such that the first STO detecting circuit 403a, the (mk−0.5) bit delay circuit 415 and the second SP detecting circuit 404b in the node controller in accordance with the first embodiment of the present invention shown in FIG. 5 are removed and circuits included in a shift register circuit 600 are largely modified from those in the shift register 500 in FIG. 5. Structural components other than the above-described ones perform the completely same operations as those in FIG. 5 and they are identified by same reference numerals. It should be added that a SP detecting circuit 404a and a first STI detecting circuit 402 shown in FIG. 11 correspond to the first SP detecting circuit 404a and the first STI detecting circuit 402 shown in FIG. 5 and the former are entirely identical to the latter in structure.

An ALPHA bit shift circuit 601 included in the shift register 600 shown in FIG. 11 is such that a frame signal outputted from an input circuit 401 is delayed and shifted by a difference between the bit number mk installed on the frame signal to represent actuator data and the bit number mi representing sensor data as noted below.

$$\alpha = m(k-i)$$

(where k is larger than i)

The resultant delayed output is inputted into a S/P converting circuit 602, a mi bit shift circuit 603, an AND gate AD2, a second STI detecting circuit 604 and a first STO detecting circuit 605.

The S/P (serial/parallel) converting circuit 602 is constructed, e.g., in the form of a shift register having mk bits in the same manner as the S/P converting circuit 406 in FIG. 5, and a mk bit parallel output therefrom is fed to a latch circuit 412 via a switch circuit SW 15.

The mi bit shift circuit 603 is constructed such that the frame signal delayed by ALPHA bits in the ALPHA bit shift circuit 601 is delayed further by mi bits. Consequently, an output from the mi bit shift circuit 603 causes the inputted frame signal to be delayed by mk bits.

The second STI detecting circuit 604 detects a "STI" code in the frame signal delayed by ALPHA bits in the ALPHA bit shift circuit 601 (refer to FIG. 4) and the detection signal is then inputted into an inner controller 650 and a mi bit delaying circuit 414. The first STO detecting circuit 605 detects a "STO" code in the frame signal delayed also by ALPHA bits (refer to FIG. 4) and the detection signal is then inputted into the inner controller 650 after it is delayed by (mk−0.5) bits.

The inner controller 650 controls shifting operations of the switch circuits SW11 to SW17 in a shifting manner as shown in FIG. 12 based on outputs from the first STI detecting circuit 402, the mi bit delay circuit 414, the $T_{ERR}$ delaying circuit 416, the second detecting circuit 604, the first STO detecting circuit 605, the error checking circuit 405, the second SP detecting circuit 404b and the ERR' generating circuit 409.

Operations of the node controller 4q in accordance with the third embodiment of the present invention will be described below with reference to FIG. 13 which shows a plurality of time charts.

First, while the inner controller 650 is held in an initial state having no frame signal inputted thereinto, it shifts contacts in the switch circuit SW11 to a 0-2 state and turns on the switch circuit 13. However, other switch circuits are turned off. Accordingly, a "STI" code at the head end of the frame signal inputted into the node controller 4q passes through an input circuit 401, an ALPHA bit shift circuit 601, an AND gate AD2, an OR gate OR1, the switch circuit SW11 and an output circuit 410 so that it is delivered to a node controller 4(q+1) at the subsequent stage. Namely, after the STI code is delayed for a period of time corresponding to ALPHA bits, it is delivered to the node controller 4(q+1) at the subsequent stage.

On the other hand, the first detecting circuit 402 detects a "STI" code at a time point $t_{10}$ when the tail end of the "STI" code in the frame signal is inputted from the input circuit 402 thereinto and the detection signal is then inputted into the inner controller 650 (see FIG. 13(d)). This causes the inner controller 650 to turn on the switch circuit SW14 (see FIG. 13(o)), and code portions located after a "DI" code in the frame signal are inputted into the error checking circuit 405.

Figure 13:
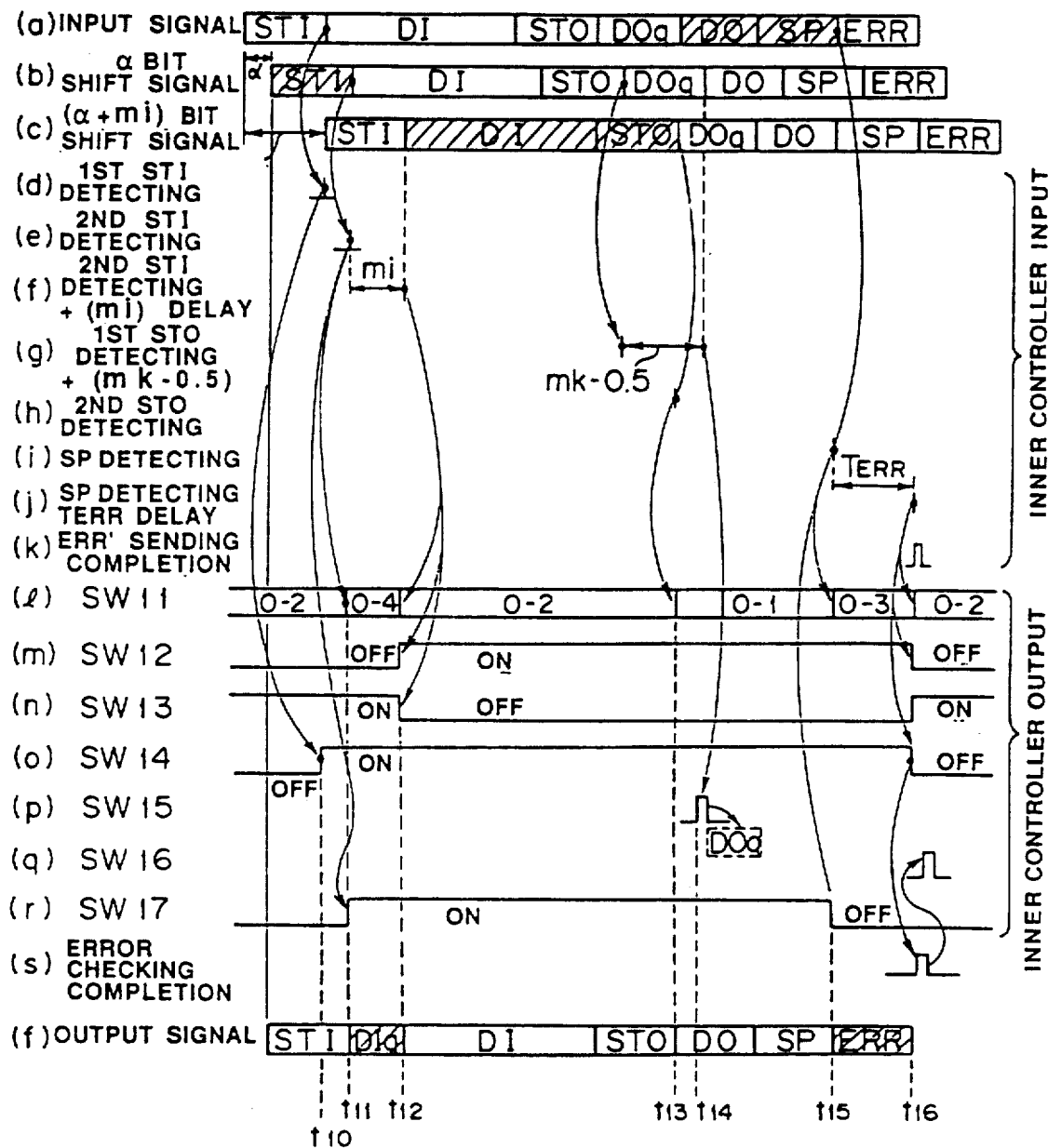
FIG. 13 shows a plurality of time charts which illustrate by way of example operations of each circuit in the node controller in accordance with the third embodiment of the present invention.

The second STI detecting circuit 604 detects a "STI" code in the frame signal delayed by ALPHA bits and the detection signal is then inputted into the inner controller 650 (at a time $t_{11}$, see FIG. 13(e)). In response to inputting of the resultant signal, the inner controller 650 shifts the switch circuit SW11 to a 0-4 state so that the switch circuit SW17 is turned on (see FIGS. 13 (l) and (r)). As a result, the switch circuit SW11 selects an output from the data generating circuit 411 later than the time $t_{11}$, and sensor data (having mi bits) of the relevant node controller 4q are outputted to a node controller at the subsequent stage.

On the other hand, the mi bit shift circuit 603 is such that the frame signal which has been delayed in the ALPHA bit shift circuit 601 by ALPHA bits is delayed further by mi bits (see FIG. 13(c)), while the mi bit delay circuit 414 is such that the detection signal derived from the second STI detecting circuit 604 is delayed by mi bits and the delayed signal is inputted into the inner controller 650 (at a time $t_{12}$, see FIG. 13(f)). This allows the inner controller 650 to shift the switch circuit SW11 to a state 0-2 (see FIG. 13(l)), turn on the switch circuit SW12 and turn off the switch circuit SW13 (see FIGS. 13(m) and (n)). As a result, an output from the mi bit shift circuit 603 is selected by the switch circuit SW11 later than the time $t_{12}$.

Thereafter, the first STO detecting circuit 605 detects a "STO" code in the frame signal which has been delayed by ALPHA bits, and after the detection time point is delayed by (mk−0.5) bits, the detection signal is inputted into the inner controller 650 (at a time $t_{14}$, see FIG. 13(g)). Substantially in parallel with this, the second STO detecting circuit 404b detects a "STO" code in the frame signal which has been delayed by (α+mi) and the detection signal is inputted into the inner controller 650 (at a time $t_{13}$, see FIG. 13(h)).

In response to inputting of the detection signal of the second STO detecting circuit 404b, the inner controller 650 sends the frame signal having no delay to the node controller at the subsequent stage by shifting the switch circuit SW11 to a 0-1 state (at the time $t_{13}$). Further, in response to inputting of the detection signal of the first STO detecting circuit 402, the inner controller 650 turns on the switch circuit SW15 to latch to the latch circuit 412 data DOq present in the S/P converting circuit 602 at this time (at a time $t_{14}$, see FIG. 13(p)). As is apparent from FIG. 13, actuator data DOq associated with the node controller 4q is present in a mk bit parallel output from the S/P converting circuit 602 at the time $t_{14}$, and the actuator data DOq having mk bits are latched in the latch circuit 412.

Thereafter, the SP detecting circuit 404a detects a "SP" code in the frame signal at a time $t_{15}$ and the detection signal is then inputted into the inner controller 650. This causes the inner controller 650 to shift the switch circuit SW11 to a 0-3 state at the time $t_{15}$ and turn off the switch circuit SW17 (see FIGS. 13(l) and (r)).

Namely, for a period of time of $t_{11}$ to $t_{13}$, a sensor data row DI of other node and a "STO" code which have consequently been delayed in the mi bit shift circuit 603 by (α+mi) bits are outputted from the switch circuit SW11, while for a period of time of $t_{13}$ to $t_{15}$, an actuator data DO of the other node and a "SP" code in the frame signal having no delay are outputted from the switch circuit SW11. Then, these "DI", "STO", "DO" and "SP" codes are outputted to the node controller 4(q+1) at the subsequent stage via the output circuit 10.

Further, in response to shifting of the switch circuit SW11 to a 0-3 state at the time $t_{15}$, an "ERR'" code generated in the ERR' generating circuit 409 is sent later than the time $t_{15}$. Thereafter, when the sending operation of the "ERR'" code is completed, the ERR' generating circuit 409 inputs the detection signal into the inner controller 650 (at a time $t_{16}$, see FIG. 13(k)).

On the other hand, the $T_{ERR}$ delaying circuit 416 delays the detection time point $t_{15}$ of the SP detecting circuit 404 by $T_{ERR}$ bits (corresponding to the number of bits of the "ERR'" code) and the delayed signal is then inputted into the inner controller 650 (at the time $t_{16}$, see FIG. 13(j)). In response to inputting of the delayed signal, the inner controller 650 shifts the contacts in the switch circuit SW11 to a 0-2 state, turn off the switches SW12 and SW14 and turn on the switch circuit SW13 at the time $t_{16}$. This causes the node controller 4q to be brought in a waiting state so as to allow a next frame signal to be inputted thereinto.

The error checking circuit 405 inputs into the inner controller 650 an error checking completion signal indicative of the content of an error checking operation for a period of time of $t_{10}$ to $t_{16}$. The inner controller 650 turns on the switch circuit SW16 only when a normal error checking completion signal is inputted from the error check circuit 405, and latch data of the latch circuit 412 is then received in the actuator driving signal generating circuit 413 (see FIGS. 13(q) and (s)).

Specifically, the apparatus according to the third embodiment of the present invention is constructed such that each node controller is held under a condition that i is set smaller than k and a frame signal outputted from each node controller is prepared in the form of an adequate combination among frame signal having no delay, frame signal delayed by ALPHA bits (which are equal to m(k−i) bits) and frame signal advanced by ALPHA bits plus mi bits (which are equal to mk bits). As will be apparent from FIG. 14, a "SP" code and an "ERR" code are received at each node at the entirely same time, whereby the switch circuit SW15 and the switch circuit SW16 are turned on at the same time at each node controller. This assures that data are given to a group of actuators at each node with simultaneity.

It should be added that according to the third embodiment of the present invention, either an output from the $T_{ERR}$ delay circuit 416 or an ERR' sending completion signal generated in the ERR' generating circuit 409 may be used to detect the time $t_{16}$.

Figure 15:
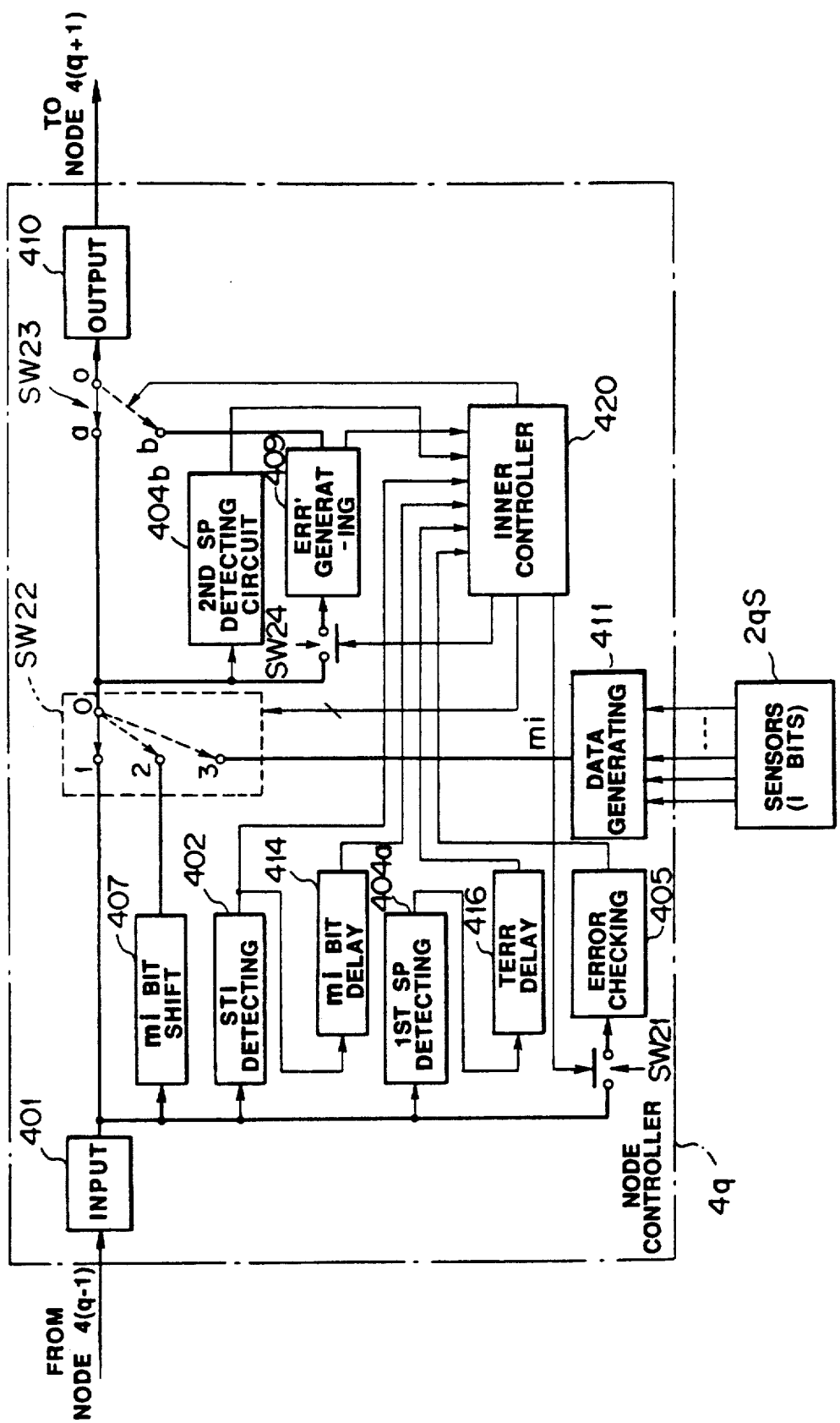
FIG. 15 is a block diagram which illustrates by way of example the circuit structure of a node controller used for the apparatus in accordance with a fourth embodiment of the present invention.

FIG. 15 is a block diagram which schematically shows an apparatus for carrying out serial control in accordance with a fourth embodiment of the present invention, particularly illustrating by way of example the circuit structure of a node controller which controls only a group of sensors. In practice, the apparatus is constructed as mentioned in the above-described paragraph (B) or (C), wherein a protocol as mentioned in the above-described paragraph (a), (c), (d), (e) or (g) is employed for the apparatus.

Specifically, a node controller 4q disposed at a qth location is exemplified in FIG. 15, and it includes an input circuit 401, a STI detecting circuit 402, first and second SP detecting circuits 404a and 404b, an error checking circuit 405, a mi bit shift circuit 407 an ERR' generating circuit 409, an output circuit 410, a data generating circuit 411, a mi bit delay circuit 414 and a $T_{ERR}$ delay circuit 416. In addition, the node controller 4q includes an inner controller 420 which receives outputs from the STI detecting circuit 402, the mi bit delay circuit 414, the $T_{ERR}$ delay circuit 416 and the second SP detecting circuit 404b, an error checking completion signal from the error checking circuit 405 and an ERR' sending completion signal from the ERR' generating circuit to control shifting of first to fourth switch circuits SW21 to 24 arranged in the node controller 4q.

Figures 14, 16:
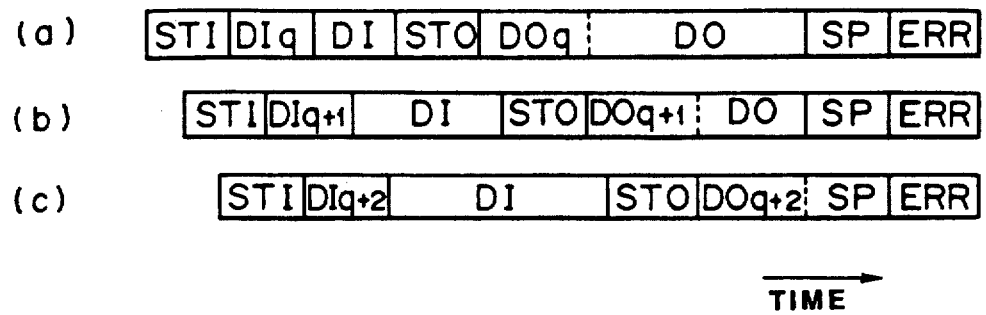
FIG. 14 shows a plurality of time charts which illustrate a process by way of which a frame signal is propagated in accordance with the third embodiment.
FIG. 16 is an explanatory view which schematically illustrates functions of an inner controller in accordance with the fourth embodiment of the present invention.

FIG. 16 is a diagram which illustrates an input/output logic of the inner controller 420 in the node controller 4q. In response to inputting of a frame signal, the node controller 4q is operated in such a manner as shown in FIG. 17 by controlling a shifting operation of each of the switch circuits SW21 to SW24 shown in FIG. 16.

Figure 17:
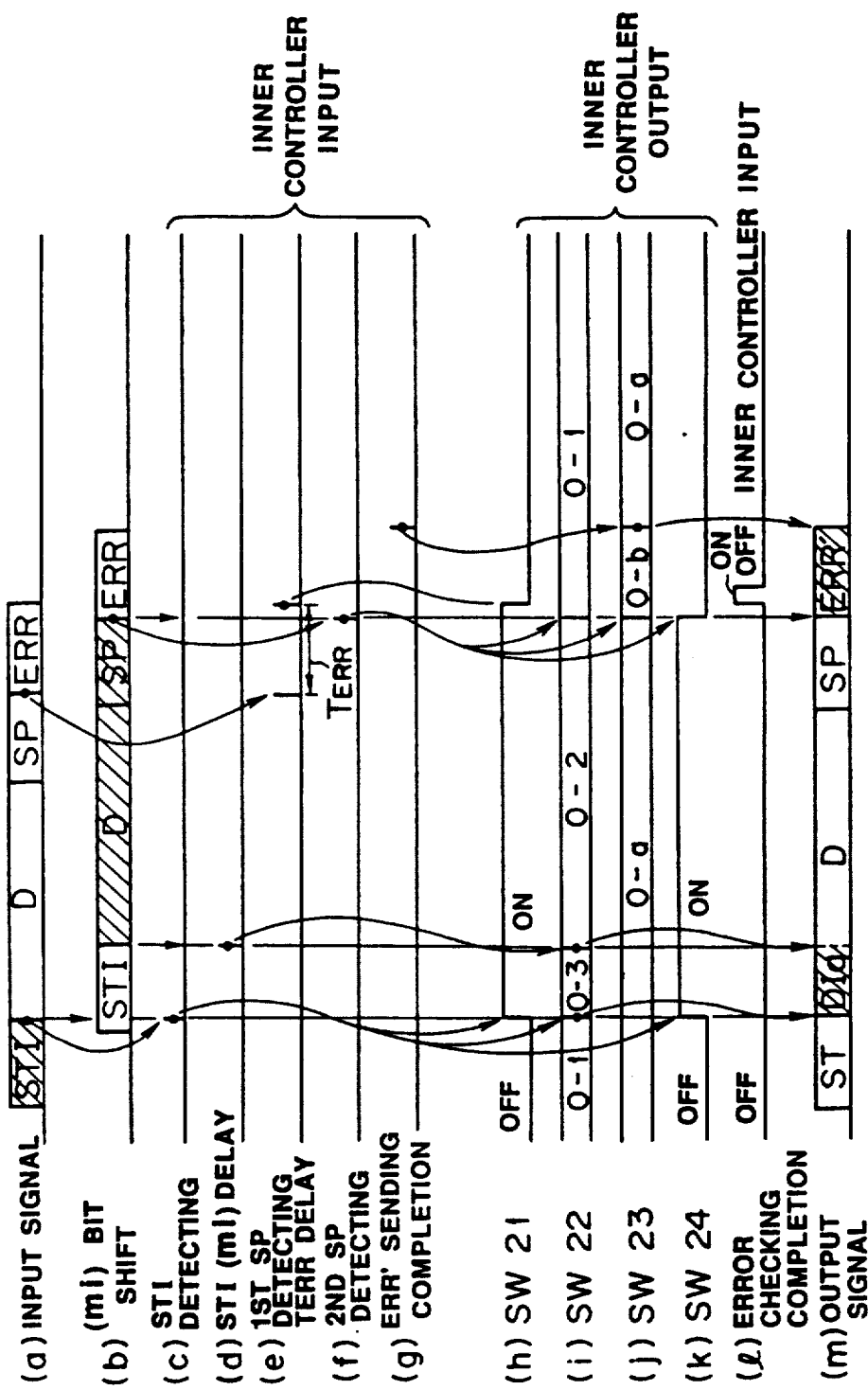
FIG. 17 shows a plurality of time charts which illustrate by way of example operations of each circuit in the node controller in accordance with the fourth embodiment of the present invention.

Referring to FIG. 17, portions as shown by hatched lines represent portions each of which is selectively outputted as an element constituting a frame signal to be transmitted to a node controller 4(q+1) at the subsequent stage.

As is apparent from FIG. 17, with the node controller 4q shown in FIG. 15, only a "STI" code and a "SP" code in the inputted frame signal are detected so that sensor data "DIq" are placed just behind the "STI" code. Thus, even though a "STP" code and a "DO" code are present in the inputted frame signal, they pass through the node controller 4q as a signal to be transmitted to the node controller 4(q+1) at the subsequent stage.

Further, according to the fourth embodiment of the present invention, sensor data are received in the frame signal at each node at a same time in the same manner as in the first and second embodiments of the present invention. Therefore, even in a case where the fourth embodiment of the present invention is practiced in combination with the first and second embodiments of the present invention, data are reliably received in the frame signal with simultaneity.

Figure 18:
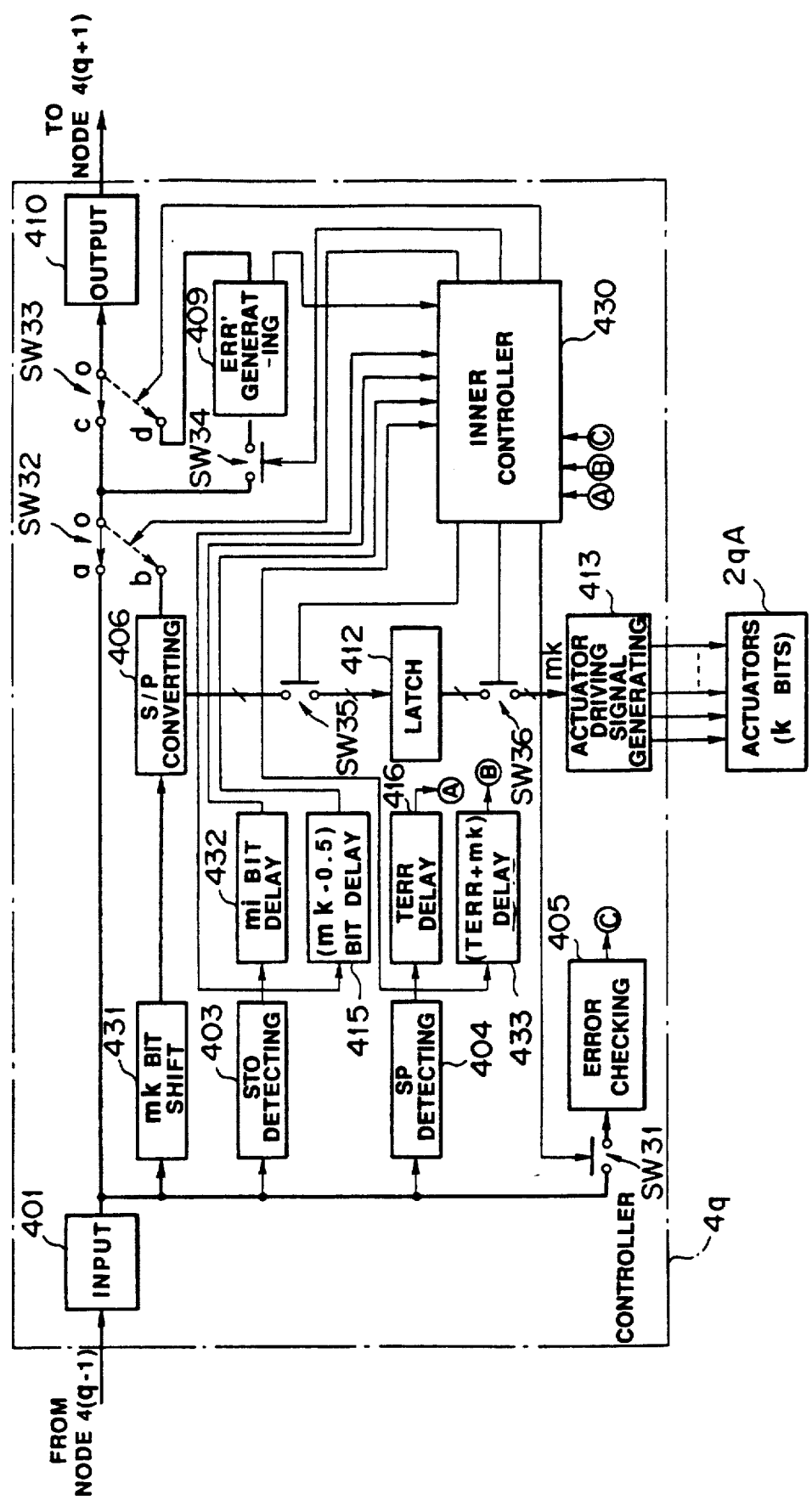
FIG. 18 is a block diagram which illustrates by way of example the circuit structure of a node controller used for the apparatus in accordance with a fifth embodiment of the present invention.

FIG. 18 is a block diagram which schematically shows an apparatus for carrying out serial control in accordance with a fifth embodiment of the present invention, particularly illustrating by way of example the circuit structure of a node controller which controls only a group of actuators. In practice, the apparatus is constructed as mentioned in the above-described paragraphs (B), (D) or (e), wherein a protocol as mentioned in the above-described paragraph (a), (b), (d), (f) or (h) is employed for the apparatus.

As shown in FIG. 18, a node controller 4q disposed at a qth location includes an input circuit 401, a STO detecting circuit 403, a SP detecting circuit 404, an error checking circuit 405, a data extracting circuit 406, an ERR' generating circuit 409, an output circuit 410, a latching circuit 412, an actuator driving signal generating circuit 412, a (k×1−0.5) bit delay circuit 415 and a $T_{ERR}$ delay circuit 416. Further, the node controller 4q includes an inner controller 430 which receives outputs from a mk bit shift circuit 431 for shifting an inputted frame signal by mk bits, a mk bit delay circuit 432 adapted to receive a code detection output (i.e., a "STO" detection output from a STO detecting circuit 403) and output the code detection output delayed by mk bits, a ($T_{ERR}$+mk) delay circuit adapted to receive a code detecting output (i.e., a "SP" detection output from a SP detecting circuit 404) and output a delayed code detection output delayed by ($T_{ERR}$+mk) bits, the STO detecting circuit 403, the mk bit delay circuit 432, a (mk−0.5) bit delay circuit 415, the SP detecting circuit 404, a $T_{ERR}$ delay circuit 416 and the ($T_{ERR}$+mk) delay circuit 433, an error checking completion signal from the error checking circuit 404 and an ERR' sending completion signal from the ERR' generating circuit 409 and control shifting of first to sixth switch circuits SW31 to SW 36 in the node controller 4q.

FIG. 19 is a diagram which illustrates an input/output logic for the inner controller 430 in the node controller 4q shown in FIG. 18. In response to inputting of the frame signal, the node controller 4q is operated in such a manner as shown in FIG. 20 by controlling a shifting operation of each of the switch circuits SW31 to SW36 as shown in FIG. 19.

Figure 20:
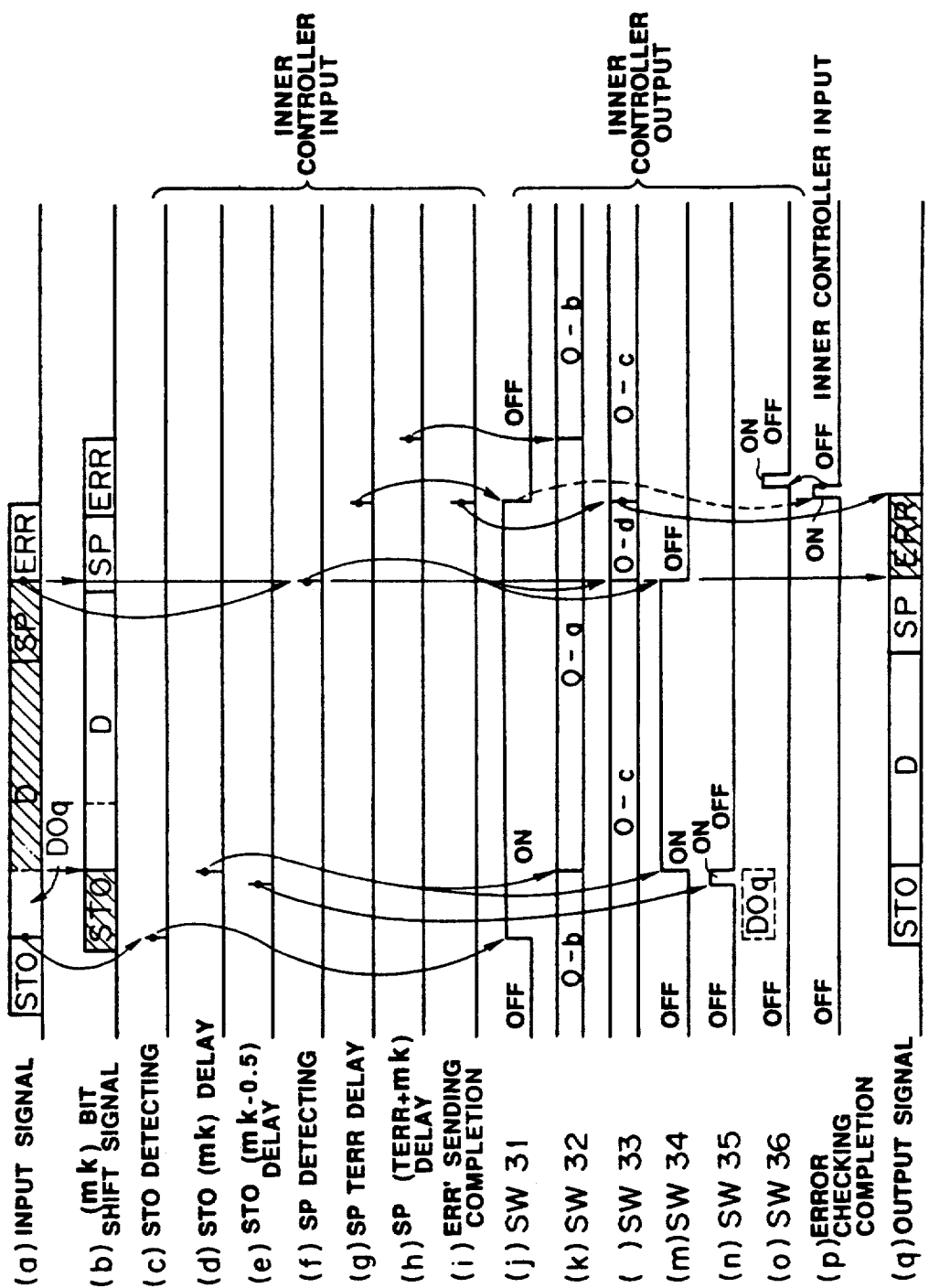
FIG. 20 shows a plurality of time charts which illustrate by way of example operations of each circuit in the node controller in accordance with the fifth embodiment of the present invention.

Referring to FIG. 20, portions shown by hatched lines represent portions each of which is selectively outputted as an element constituting a frame signal to be transmitted to a node controller 4(q+1) at the subsequent stage.

As is apparent from FIG. 20, with the node controller $4q$ shown in FIG. 18, only a "STO" code and a "SP" code are detected, and actuator control data "DOq" are extracted from a location just behind the "STO" code. Even though a "STI" code and a "DI" code are present in the inputted frame signal, they pass through the node controller $4q$ as signals to be transmitted to a node controller $4(q+1)$ at the subsequent stage as they are left unchanged. A mechanism for receiving the actuator control data "DOq" in the actuator driving signal generating circuit 413 is same as that for the node controller shown in FIG. 5 or FIG. 11.

Further, according to the fifth embodiment of the present invention, data are given to a group of actuator at each node at a same time in the same manner as in the first and third embodiments of the present invention. Therefore, even when the fifth embodiment of the present invention is practiced in combination with the first embodiment or the third embodiment of the present invention, it is assured that control data are given with simultaneity.

As will be readily apparent from the above description, the present invention has been described above as to the structure of each of several node controllers to which the present invention is applied under conditions of employment of one of the structures for the apparatus as explained in the above-described paragraphs (A) to (E) in combination among the protocols as explained in the above-described paragraphs (a) to (h). With respect to a node controller for which other combination (not described) is employed and a node controller adapted to control a group of sensors as well as a group of actuators under conditions of employment of the structure for the apparatus as explained in the above-described paragraph, e.g., (A) or (B) as well as employment of the protocol as explained in the above-described paragraph (b), (c), (d), (e) or (f), these node controllers can easily be constructed in the same manner as the above-exemplified node controllers by adjusting the frame signal to an arbitrary phase based on detection of target codes ("STI", "STO" and "SP") from the inputted frame signal.

It should of course be understood that the present invention should not be limited only to the aforementioned embodiments but adequate change or modification may be made with them. For example, the respective circuits in the node controller shown in FIG. 5, FIG. 11, FIG. 15 and FIG. 18 may be changed to other arbitrary circuits, provided that it is proven that they exhibit the substantially same function as described above.

Figure 4:
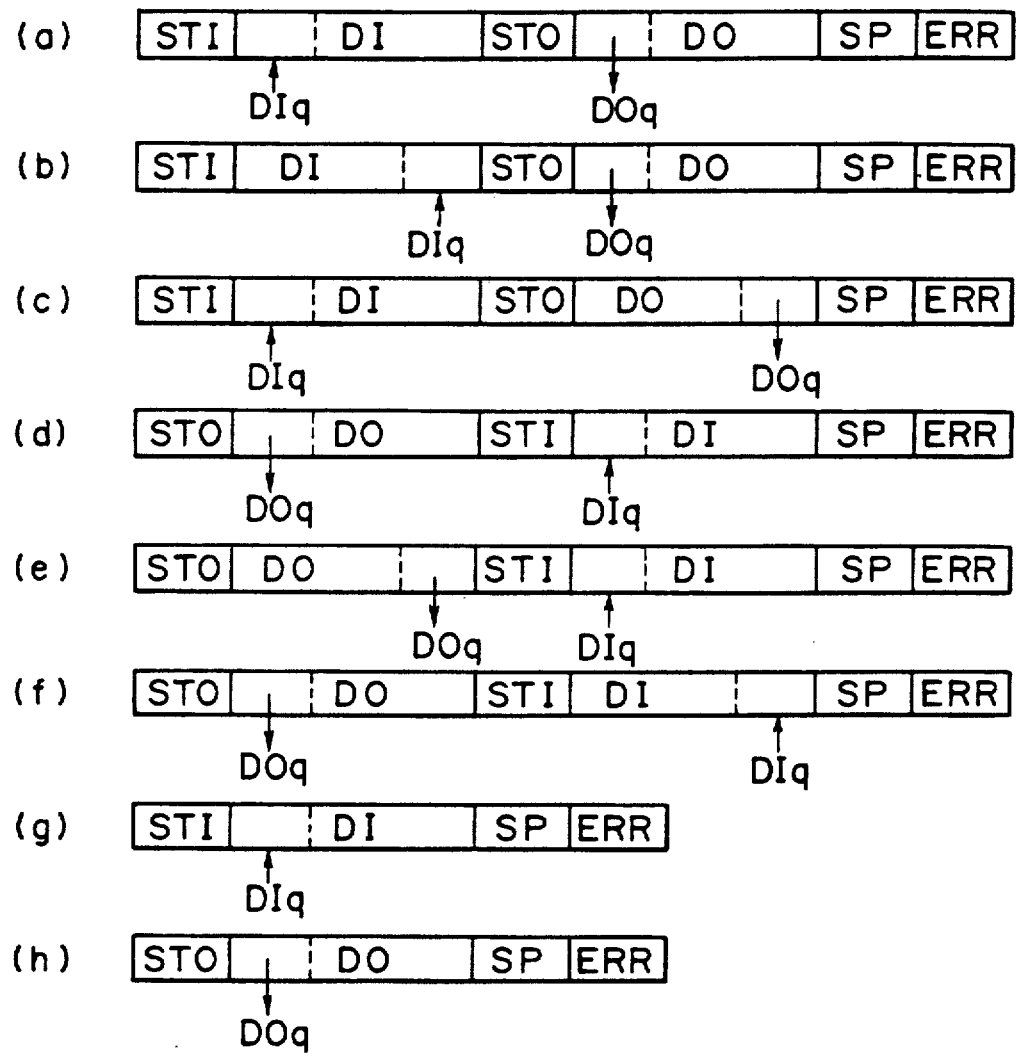
FIG. 4 shows a plurality of schematic views which illustrate by way of example the frame structure of a data signal used for the apparatus of the present invention, as well as a plurality of protocols for receiving and sending the data signals.

Further, with respect to the frame structure shown in FIG. 4, an error code for informing various errors to the main controller is neglected. However, this error code may additionally be placed, e.g., after the error check code "ERR".

The foregoing embodiments have been described such that the data coding shown in Table 2 is executed with a same bit number m for sensors and actuators. Alternatively, a coding bit length m for sensor data, of course, may not be equal to a coding bit length m' for actuator data.

The detailed structure of the main controller 30 constituting the apparatus for carrying out serial control is neglected for the purpose of simplification of illustration. It suffices that the main controller 30 includes a circuit adapted to output a signal SO in a fashion as shown in, e.g., in FIG. 8(a) or FIG. 10(a) and receive a signal S5 or a signal Sn to be fed back in a fashion as shown in FIG. 8(f) or FIG. 10(f) (with the daisychain-shaped configuration as mentioned in the paragraph (E), the circuit just outputs the signal SO). The circuit can easily be constructed in an arbitrary manner depending on the configuration of each of the frame signals shown in FIG. 4. With the apparatus of the present invention, a protocol for receiving and sending signals is determined depending on the structure of each node controller.

Further, description has been made above such that terminal elements to be controlled directly by each node controller are sensor or actuators. Alternatively, any other terminal elements, of course, may be acceptable, provided that it is proven that they are terminal elements by way of which data are inputted into the apparatus or terminal elements by way of which data are outputted from the apparatus of the present invention.

INDUSTRIAL APPLICABILITY

As will be readily understandable from the above description, the present invention can provide the following excellent advantageous effects.

(1) The apparatus of the present invention assures that data receiving and data sending can be accomplished at a same time in each node controller under a condition that the circuit structure is entirely same for all the node controllers. This makes it possible to improve reliability of the circuit system at an inexpensive cost.

(2) Terminal components for the apparatus can rationally be controlled at a high efficiency with a very simple wiring structure for signal lines.

(3) Owing to the structure as mentioned in the preceding paragraph, even in a case where a machine is provided with a large number of terminal components, a space required for a wiring operation can be reduced. Consequently, the machine itself can be designed and constructed in smaller dimensions.

(4) Since each node controller adapted to control terminal components directly does not require any address or the like element, addition of terminal components, removal of terminal components or exchanging of terminal components with another ones can be accomplished without any necessity for taking account of a signal transmission system. Moreover, reforming and rebuilding of the machine can achieved easily.

We claim:

1. In an apparatus for carrying out serial control wherein a plurality of nodes are connected to each other in series via signal lines, at least one first terminal component into which data is inputted and at least one second terminal component from which said data are outputted are connected to each node and feeding of data of relevant first terminal component to a frame signal is carried out at each node having said first terminal component connected thereto, while extracting of data to be outputted to relevant second terminal component from said frame signal is carried out at said node having said second terminal component connected thereto, between adjacent frame signals adapted to be propagated through the respective nodes via said signal lines, the improvement wherein;

the frame signal includes in one frame a first identification code for indicating the head position relative to data of one of the first terminal component and a second identification code for indicating the head position relative to data to be outputted to the second terminal component, said node having at least the first terminal component connected thereto includes;

first detecting means for detecting said first identification code from an inputted frame signal while outputting said inputted frame signal to a node at the subsequent stage, first shifting means for shifting said inputted frame signal by a length equivalent to data of said first terminal component connected thereto based on detection of said first identification code and first controlling means for feeding data of the first terminal component connected thereto to a location just behind the detected first identification code of the inputted frame signal based on detection of the first identification code and outputting to a node at the subsequent stage signal portions later than the time when the frame signal is shifted by said first shifting means, subsequent to the frame signal having data of the first terminal components fed thereto, said node having at least the second terminal components connected thereto includes;

second shifting means for shifting an inputted frame signal by a length equivalent to data to be outputted to the second terminal component connected thereto, second detecting means for detecting the second identification code from the inputted frame signal, and second controlling means for extracting data to be outputted to the second terminal component connected thereto from a location just behind the detected second identification code of the inputted frame signal based on detection of the second identification code and outputting to said node at the subsequent stage the frame signal having the data to be outputted to the second terminal component extracted therefrom, subsequent to the frame signal shifted by said second shifting means.

2. An apparatus for carrying out serial control as claimed in claim 1, wherein the node having both the first terminal component and the second terminal components connected thereto further includes;

third shifting means for shifting the inputted frame signal by a difference between a length of data of the first terminal component connected thereto and a length of data to be outputted to the second terminal component connected thereto and third controlling means for adjusting the structure of a frame signal to be outputted to the node at the subsequent stage such that no overlapping or no spacing occurs with elements of said frame signal by using the frame signal shifted by said third shifting means.

3. An apparatus for carrying out serial control as claimed in claim 2, wherein the frame signal includes in one frame the first identification code at the front part and the second identification code at the rear part thereof, when it is assumed that a length of data of the first terminal component is represented by mi and a length of data to be outputted to the second terminal component is represented by mk, the following relationship is established between said mi and said mk, i.e., $$mi \geq mk$$

said third shifting means shifts the inputted frame signal by the following difference between the length of said data of the first terminal component and the length of said data of the second terminal component, i.e., $$mi - mk$$

and said third controlling means detects the second identification code from the frame signal shifted by said first shifting means and outputs to the node at the subsequent stage signal portions induced later than the time when the frame signal is shifted by said third shifting means, subsequent to the detected second identification code.

4. An apparatus for carrying out serial control as claimed in claim 2, wherein the frame signal includes in one frame the first identification code at the front part and the second identification code at the rear part thereof, when it is assumed that a length of data of the first terminal component is represented by mi and a length of data to be outputted to the second terminal component is represented by mk, the following relationship is established between said mi and said mk, i.e., $$mk < mk$$

said third shifting means previously shifts the inputted frame signal by ALPHA which is defined by the following equation, i.e., $$\alpha = mk - mi$$

said first detecting means, said first shifting means and said first controlling means regard the frame signal shifted by the third shifting means as the inputted frame signal and execute said detecting, said shifting and said controlling, and said third controlling means detects the second identification code from the frame signal shifted by said third shifting means and said first shifting means and outputs to the node at the subsequent stage signal portions induced later than the time when the frame signal is inputted, subsequent to the detected second identification code.

* * * * *